INVENTOR
DONALD E. WALLIS
BY Ronald J. Clark
ATTORNEY

March 31, 1970 D. E. WALLIS 3,504,349

ADDRESS EXAMINATION MECHANISM FOR USE IN A SYSTEM OPERATING WITH DYNAMIC STORAGE RELOCATION

Filed Sept. 27, 1967 29 Sheets-Sheet 5

March 31, 1970 D. E. WALLIS 3,504,349
ADDRESS EXAMINATION MECHANISM FOR USE IN A SYSTEM
OPERATING WITH DYNAMIC STORAGE RELOCATION
Filed Sept. 27, 1967 29 Sheets-Sheet 6

March 31, 1970 D. E. WALLIS 3,504,349

ADDRESS EXAMINATION MECHANISM FOR USE IN A SYSTEM OPERATING WITH DYNAMIC STORAGE RELOCATION

Filed Sept. 27, 1967 29 Sheets-Sheet 8

March 31, 1970 D. E. WALLIS 3,504,349

ADDRESS EXAMINATION MECHANISM FOR USE IN A SYSTEM OPERATING WITH DYNAMIC STORAGE RELOCATION

Filed Sept. 27, 1967 29 Sheets-Sheet 9

March 31, 1970 D. E. WALLIS 3,504,349

ADDRESS EXAMINATION MECHANISM FOR USE IN A SYSTEM OPERATING WITH DYNAMIC STORAGE RELOCATION

Filed Sept. 27, 1967 29 Sheets-Sheet 12

March 31, 1970 D. E. WALLIS 3,504,349

ADDRESS EXAMINATION MECHANISM FOR USE IN A SYSTEM OPERATING WITH DYNAMIC STORAGE RELOCATION

Filed Sept. 27, 1967 29 Sheets-Sheet 14

March 31, 1970 D. E. WALLIS 3,504,349

ADDRESS EXAMINATION MECHANISM FOR USE IN A SYSTEM OPERATING WITH DYNAMIC STORAGE RELOCATION

Filed Sept. 27, 1967 29 Sheets-Sheet 21

March 31, 1970 D. E. WALLIS 3,504,349

ADDRESS EXAMINATION MECHANISM FOR USE IN A SYSTEM OPERATING WITH DYNAMIC STORAGE RELOCATION

Filed Sept. 27, 1967 29 Sheets-Sheet 22

March 31, 1970 D. E. WALLIS 3,504,349

ADDRESS EXAMINATION MECHANISM FOR USE IN A SYSTEM OPERATING WITH DYNAMIC STORAGE RELOCATION

Filed Sept. 27, 1967 29 Sheets-Sheet 23

United States Patent Office 3,504,349

Patented Mar. 31, 1970

3,504,349

ADDRESS EXAMINATION MECHANISM FOR USE IN A SYSTEM OPERATING WITH DYNAMIC STORAGE RELOCATION

Donald E. Wallis, Marblehead, Mass., assignor to International Business Machines Corporation, Armonk, N.Y., a corporation of New York Filed Sept. 27, 1967, Ser. No. 671,063
Int. Cl. G06f *9/20*
U.S. Cl. 340—172.5 9 Claims

ABSTRACT OF THE DISCLOSURE

The present invention is directed toward an improved address examining mechanism employing a plurality of registers for maintaining the last address entries for the various levels of addressing in the system. Additionally, a plurality of latches are furnished for indicating the activity in changing and using the addresses located in the address registers. Additional control circuitry interconnects the latches and registers along with the address buses to indicate when the addresses in the registers are suitable for use and when additional addresses need be withdrawn from the main memory.

The present invention relates to dynamically relocating groups of electrical manifestations between a large capacity storage unit and a smaller capacity storage unit and the mechanism for examining each logical address used. More specifically, when a page or group of electrical manifestations are retrieved from the large capacity storage unit, it may be placed anywhere within the small capacity storage unit. Circuits are provided for maintaining continuity between locations so that an often moved group of electrical manifestations can be retrieved whenever desired. After one electrical manifestation in a group is properly identified, the present invention operates to permit repeated references to this group by a plurality of subsequent logical addresses without an appreciable loss in systems performance.

Dynamic storage relocation has existed for some time. However, the previous systems have been completely software oriented whereby existing systems through programming techniques operate in a relocate mode. These software oriented systems are relatively slow in operation and they are only applicable to special purpose systems.

SUMMARY OF THE INVENTION

Dynamic storage relocation (DSR) finds usage in at least the following two circumstances. DSR is invaluable in a time sharing system wherein a plurality of users are connected to a single processing unit. DSR is also required for a processing complex having a plurality of processing units connected in parallel. Normally, the main storage unit for the time sharing system does not contain enough core storage for permanent storage of all problem programs. In these circumstances, it is necessary to move into core storage of the CPU the problem program of the user which is selected for immediate processing. The problem programs are held in a large capacity storage unit while awaiting their turn for execution. This large capacity storage unit has an access time considerably larger than the accessing time of the main memory of the processing system. In order to increase the efficiency of the processing system, it is expedient that the user's program be resident in the CPU core while it is being run. Furthermore, a plurality of user programs are resident in main storage at one time. The normal mode of operation of a time sharing system is to process one program until a waiting condition is encountered. Processing is then transferred to a new program if core and processing of this program continues to completion or until another wait state is encountered. According to the priority scheme present in the system, processing is directed to a new program or processing is continued on the program which originally caused the jump but which is now ready to be continued. Various algorithms are available which keep the processing unit operating in the most efficient manner possible. The present invention is not concerned with this type of algorithm. But it is concerned with the mechanism for maintaining address continuity when the programs resident in core must be replaced with programs resident in the large capacity storage unit. The programs in core have no assurance of being returned to core to finish the processing job in the same locations at which they were stored originally. The programs in the large capacity store being brought into core have no preassigned or preset storage location. Therefore, the instant invention is concerned with two problems: (1) identification of core locations when originally brought into core, and (2) the continuity of addressing when processing has been interrupted within a group of locations. Upon the termination of the processing operation, the group is returned to the large capacity storage device. A new memory area holds this program when it is subsequently returned to core memory.

The machine is notified that the dynamic storage relocation process is required by the setting of a switch in the program status word. This switch is the turning on of a bit and it indicates that the OP code required to direct the completion of that particular program governed by the PSW is no longer resident in main core but is in the large capacity storage device. This means that the series of OP codes in the large capacity store must be retrieved therefrom.

In operation, the improved dynamic storage relocation system described herein operates in combination with the programmer whereby the present mechanism furnishes a segment table and page table storage area and the appropriate circuits for interrogating the contents of these tables. The system user makes appropriate entries into these tables whenever a group of electrical manifestations are brought from the large capacity storage device into the core memory. More specifically, the segment table or page table designator is added to the respective page table or segment table descriptor each time this group of electrical manifestations is transferred to the core memory. During the operation of the dynamic storage relocation device, accesses to the segment and page table storage areas are made to determine whether this segment or page table is in core memory. Simultaneously, each of the segment and page table designators has associated with it a translated address giving the location and core memory at which that particular group of electrical manifestations is stored. The page and segment numbers are transferred to registers in the address examining mechanism. They are compared with the page and segment number of the current instruction. Upon the indication of a compare equal operation, no translation is required and the remaining portion of the address is used to access core storage. No translation is required since the segment and page indicia presently in the addressing mechanism is the same from the last access to main memory. This indicia currently points to a correct location holding the next instruction. When the compare operation does not indicate an equal, it is necessary to search through the segment and page tables to locate a corresponding segment and page table and to take the translated indicia therefrom for use in the next access to core memory.

The foregoing and other objects, features and advantages of the invention will be apparent from the following more particular description of a preferred embodiment of the invention, as illustrated in the accompanying drawings.

DETAILED DESCRIPTION

Figure 1:
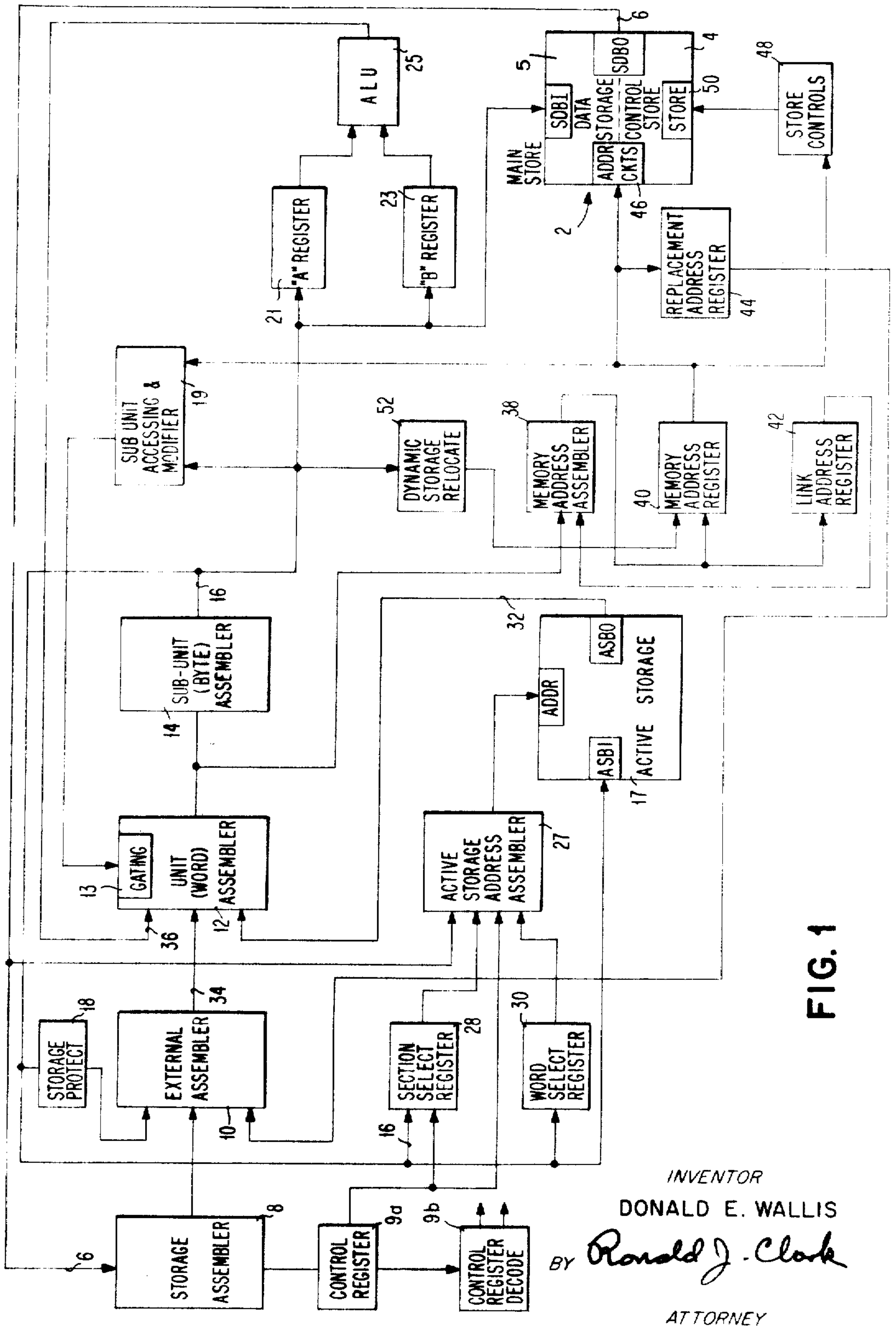
FIG. 1 is a general block diagram of a system in which the present invention could be employed.

Referring to FIGURE 1, there can be seen a block diagram of a data processing system which can advantageously employ the present invention. A main storage circuit 2 is of standard design employing cores, transistor stages, or any other well-known or accepted storage medium as the mechanism for storing an individual bit in a storage word. The words employed in the present environment comprise four individual bytes of data. Each of these bytes comprises eight binary bits of information and one bit of information is held in one storage element. Therefore, on each access to the main storage circuit 2, 32 bits of information are interrogated from or written into the 32 corresponding storage elements. The main storage circuit 2 performs a second function and that is to store the control words in a control storage area 4 integral with a data and program information storage area 5. As is well known, the purpose of the control words is to control the logic manipulations or circuit connections with the remaining circuit elements of the central processing system whereby the data contained in the data storage subsection 5 is effectively processed.

All information read from main storage is placed on a storage data bus out 6 which transfers the words of information from main storage 2 to a storage data bus out assembler 8. The output of the assembler 8 is applied to a control register 9*a* and subsequently to a control decode circuit 9*b* and directly to an external assembler circuit 10. Control words read from the control storage 4 are placed in the control register 9*a* and then decoded to bring up the proper gating and branching lines to perform the function indicated by the control word. Data or instructions read from the data storage area are gated into the assembler 10. The data flow from the assembler 10 is thereafter under the control of the particular control word in command. Depending upon the particular control word presently being executed, the data is gated into a unit or word assembler 12 and thereafter selectively gated in response to a gating circuit 13 into a sub-unit or byte assembler 14. The output of the sub-unit assembler 14 forms a main data bus 16. The main data bus 16 transfers words from the assembler 14 to an active storage circuit 17, an external register 18, a sub-unit accessing register and modifier circuit 19, and a pair of input registers 21 and 23. The registers 21 and 23 form the the inputs to an arithmetic logic unit 25. The bus 16 forms an input to the main storage unit 2. The active storage unit 17 is a separate storage unit unrelated to main storage. It comprises transistor storage elements for the storage of data. The selection of the transistor as the storage element is prompted out of the requirement that active storage must have as fast an access time as is possible. The addressing of the active storage circuit is accomplished by an active storage address assembler 27. The assembler 27 receives address indicia from a plurality of sources including a section select register 28, a word select register 30, the storage assembler 8, the control register 9*a*, and the decode circuit 9*b*. The active storage X and Y drive lines are the output of the assembler 27. Data is fed into the active storage 17 from the main data bus 16 and is read from local storage onto an active storage bus out 32. The content of the bus out 32 is entered into the unit assembler 12.

The external assembler circuit 10 is a group of gating circuits that receive data words from the storage assembler 8 and a group of hardware registers, one of which is shown at 18. The output of the external assembler 10 is an external assembler bus out 34 which is applied to the unit or word assembler 12.

Figure 3:
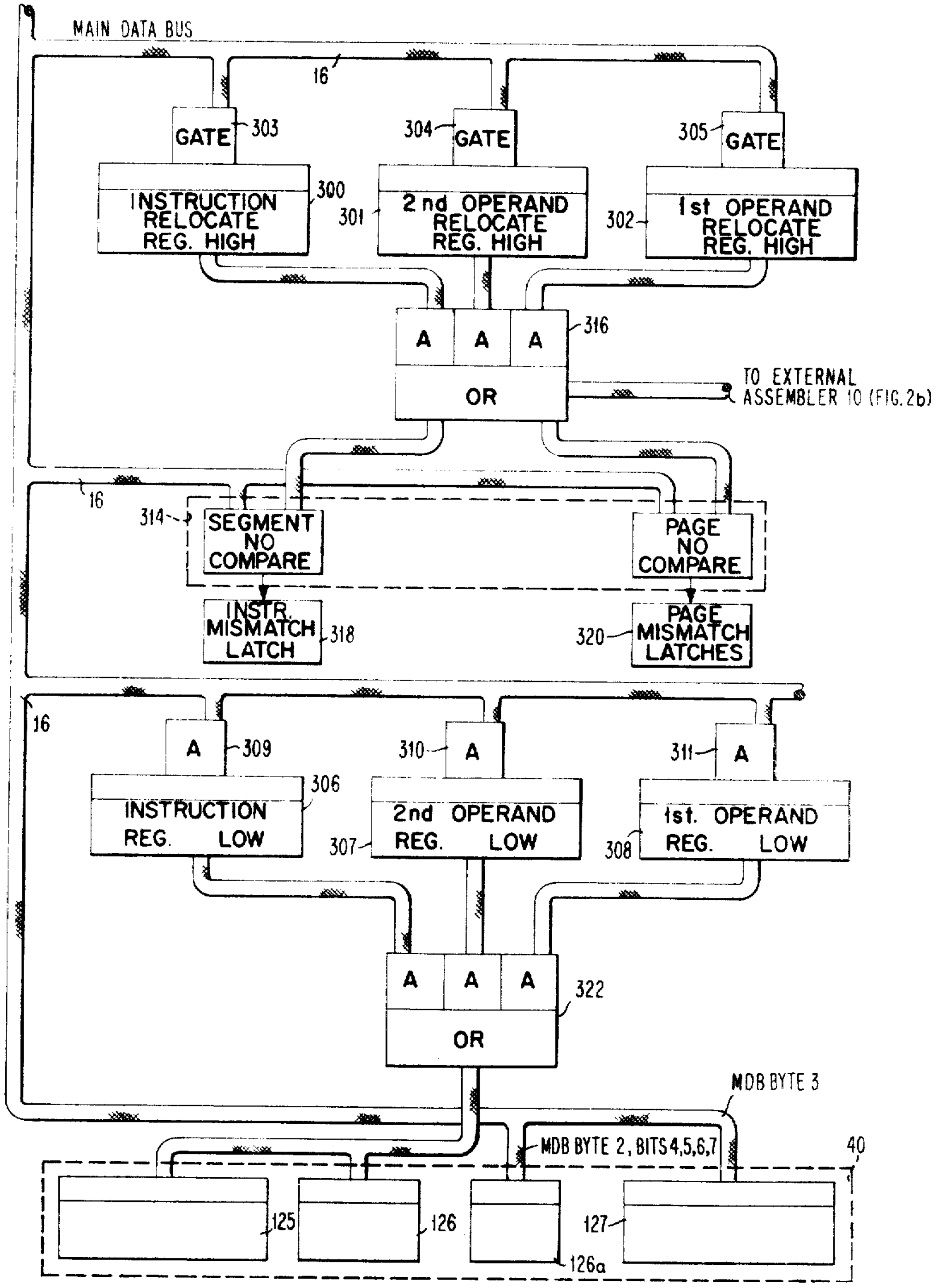
FIG. 3 is a general block diagram of the dynamic storage relocate block shown in FIG. 1.

The unit assembler 12 is divided into four sets of latch type circuits and each set may hold one byte of data. The input to the word assembler 12 is from the external assembler 10, active storage bus out 32, and an arithmetic bus 36. The output of the unit assembler 12 is applied to the sub-unit assembler 14 and a memory address assembler 38. The output of the memory address assembler 38 is applied to a memory address register 40 and a link address register 42. The output of the register 40 is applied to a replacement address register 44 and to an address circuit 46 in main storage 2. The output of the register 40 is applied to a store control circuit 48 which in turn activates a store circuit 50 with control signals. The output of the register 42 is applied to the assembler 38. The output of the register 44 is applied to the assembler 10. A dynamic storage relocate circuit 52 shown in greater detail in FIGURE 3 is connected intermediate the bus 16 and the register 40.

The primary function of the plurality of assemblers is to accept data from many sources, which sources may not have a common number of output signal lines. Additionally, the assemblers perform a translation function in that signals coming into one sub-unit portion of a first assembler are gated into a different sub-unit portion of the following assembler. The function of the sub-unit assembler 14 is to accept the byte inputs from the word assembler circuit and place these bytes on the byte 3 portion of the main data bus 16. This is done because the byte 3 portion of the main data bus has been selected as the input mechanism to both the A register 21 and the B register 23 inputs to the ALU circuit 25. Both the A register 21 and the B register 23 have a one byte storage capacity. Therefore, any information which is to be operated upon by the ALU makes its entrance into the ALU by the third byte facility of the main data bus 16. More specifically, this means that information from the word assembler is gated to the byte assembler and then on to the main data bus 16. Since gating from the word assembler into the byte assembler can be made from any of four bytes, any information coming from main storage 2 has access to the ALU circuit 25.

Figures 2, 2O:
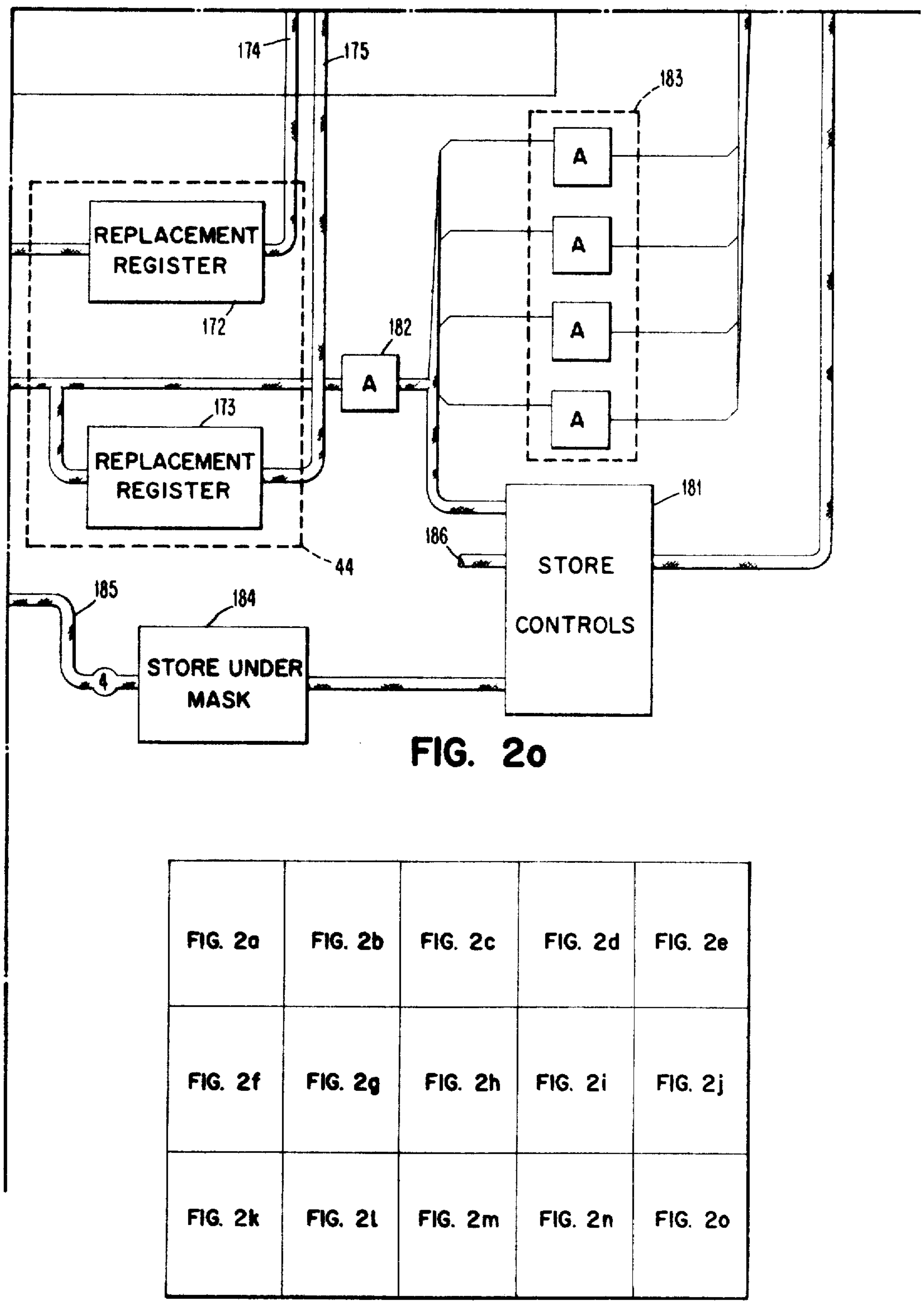
FIG. 2 shows the arrangement of FIGS. 2*a* through 2*o*.
FIGS. 2*a* through 2*o* are a more detailed block diagram of the processing system showing the several data paths used in the system.
Figure 2A:
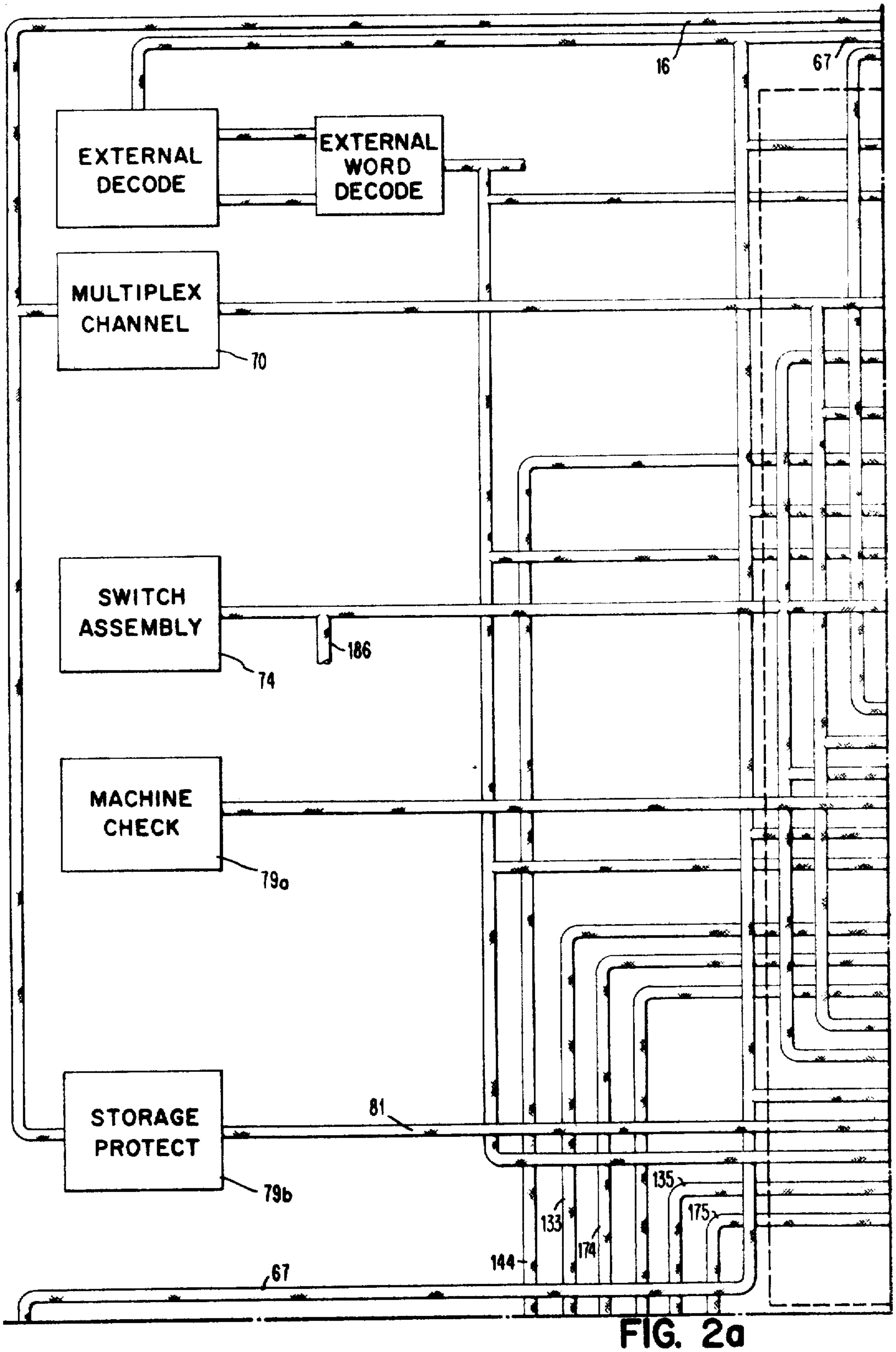

Referring to FIGURES 2, 2*a* through 2*o*, there can be seen a more detailed block diagram of a data processing system which can advantageously employ the present invention. A main storage circuit 2 is of standard design, employing cores, transistor stages, or any other well-accepted storage medium as a mechanism for storing an individual bit in a storage word. The memory selected is of the expandable type employing a plurality of basic operating modules shown in FIGS. 2*e* and 2*j* (BOM) 54 through 57. Each of the modules 54 through 57 is comparably equipped and employs the following enumerated circuits as ancillary circuits to the basic storage medium. A storage data bus in (SDBI) circuit 58 accepts the information from the main data bus 16. A store circuit 59 is an enabling circuit which indicates that the information available on the SDBI 58 associated with the BOM having the active store circuit 59 is to be stored at the location identified by the contents of the address circuit 46. In summary, the store circuit 59 provides a half select current to all locations in the selected BOM and the lines selected by the address in the address circuit 46 supply the remaining required half select current. The line selected thereby is energized to accept data from the SDBI 58. In a write-out situation, the word selected by the address circuit 46 interrogates a word location and reads it out into a storage data bus out (SDBO) circuit 61.

Each of the remaining basic operating modules is comparably equipped for storing or for reading out a unit of information, which unit comprises 16 data bits. As a matter convenience, this unit is further divided into byte sizes comprising eight data bits. Therefore, a basic operating module contains a half word of information. A BOM select control circuit 62 is the means whereby pairs of the BOM's are selected. The details of the BOM select control are well known in the prior art. Briefly, this circuit operates to enable pairs of a plurality of output lines 63 through 66 in various combinations for reading out two half words into the storage data assembler 8. The output of the storage data assembler 8 is a storage data assembler bus out (SDABO) 67. This bus 67 comprises, as a matter of convenience for the present embodiment, a full unit of information or, more specifically, 32 data bits. This means that the SDABO 67 accepts in any combination an output from the various BOMs 54 through 57. Furthermore, the SDABO combines these half words in such a manner as to properly present, in parallel, a full unit of information or a full word to the external assembler 10.

Figure 2B:
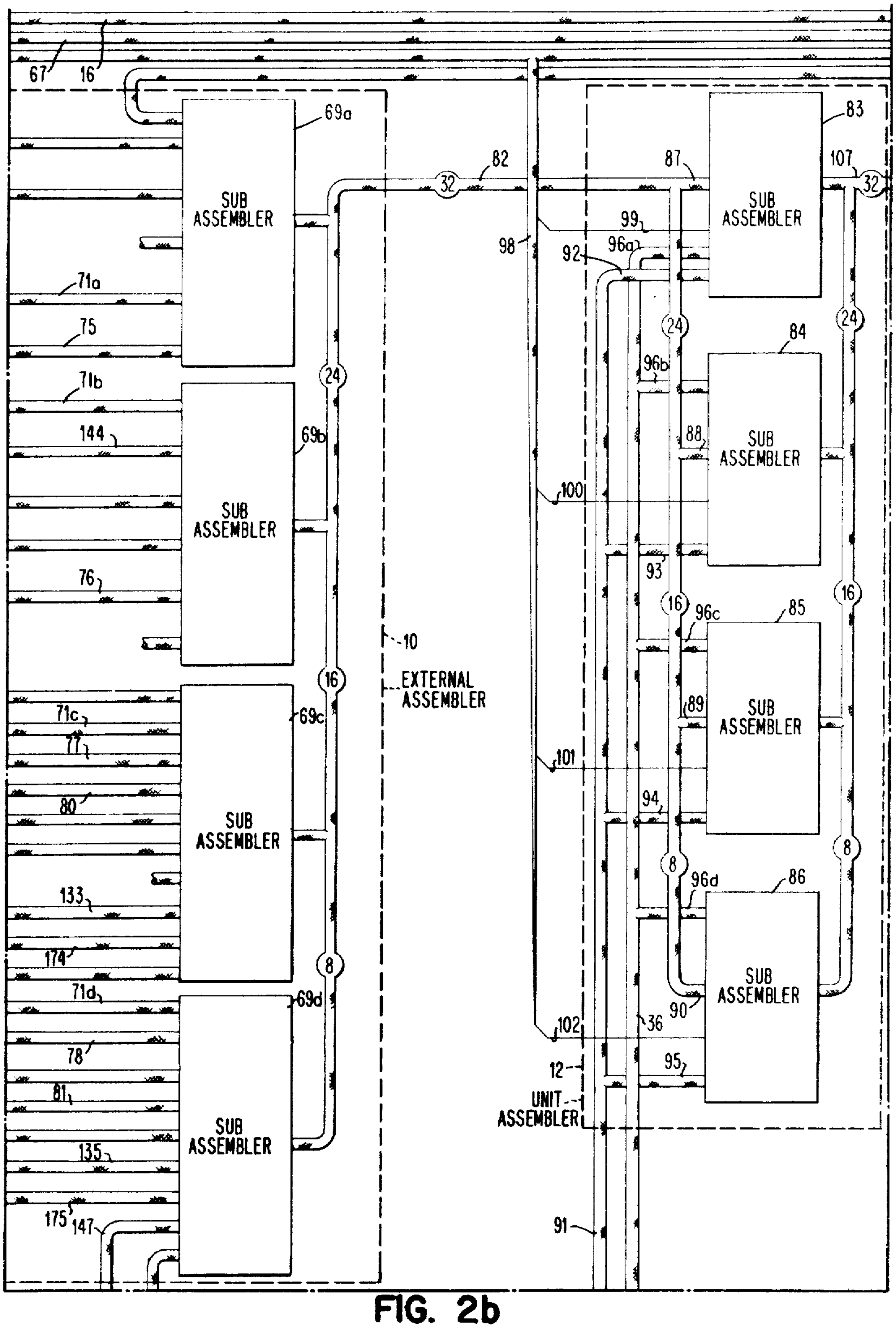
Figure 2C:
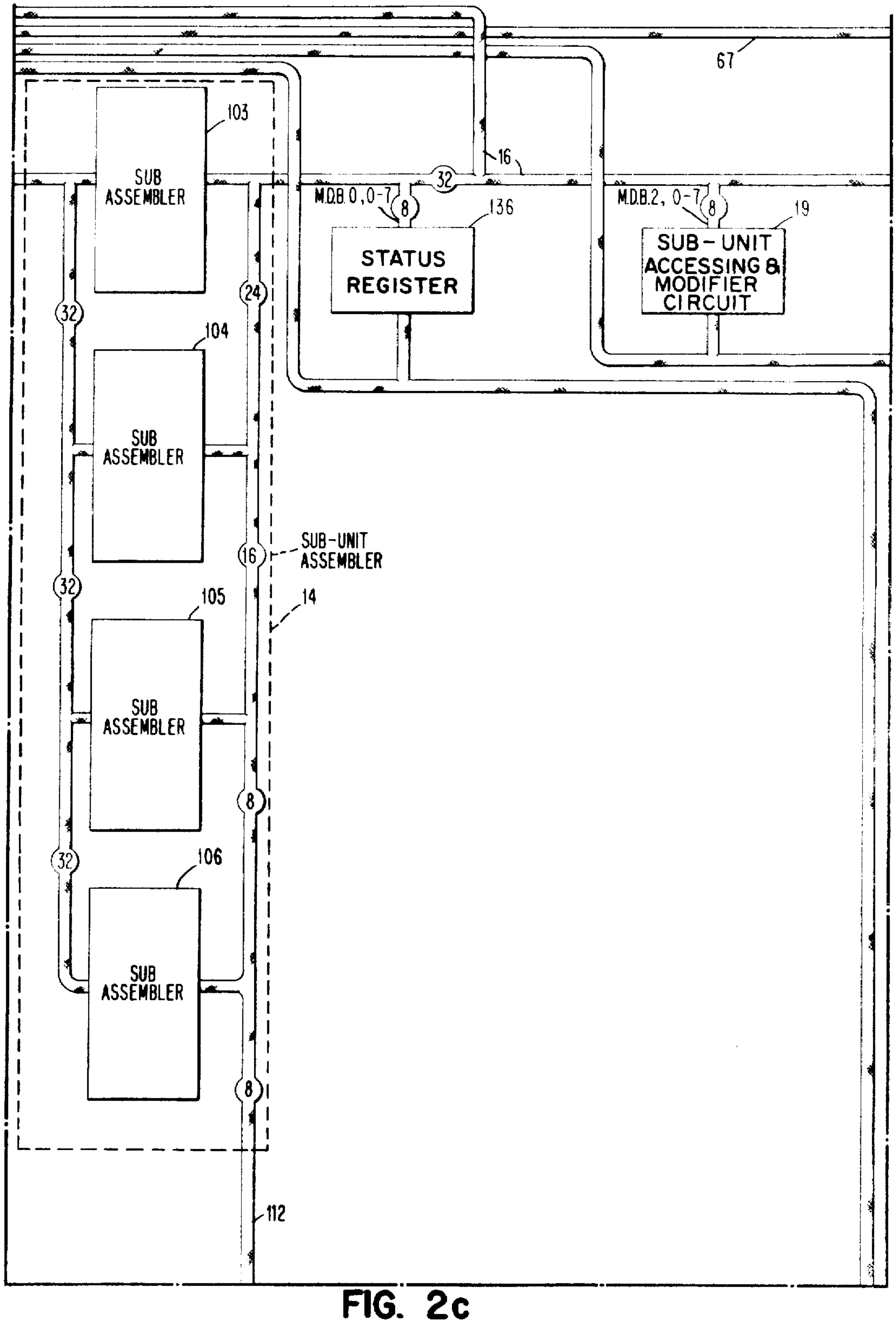
Figure 2D:
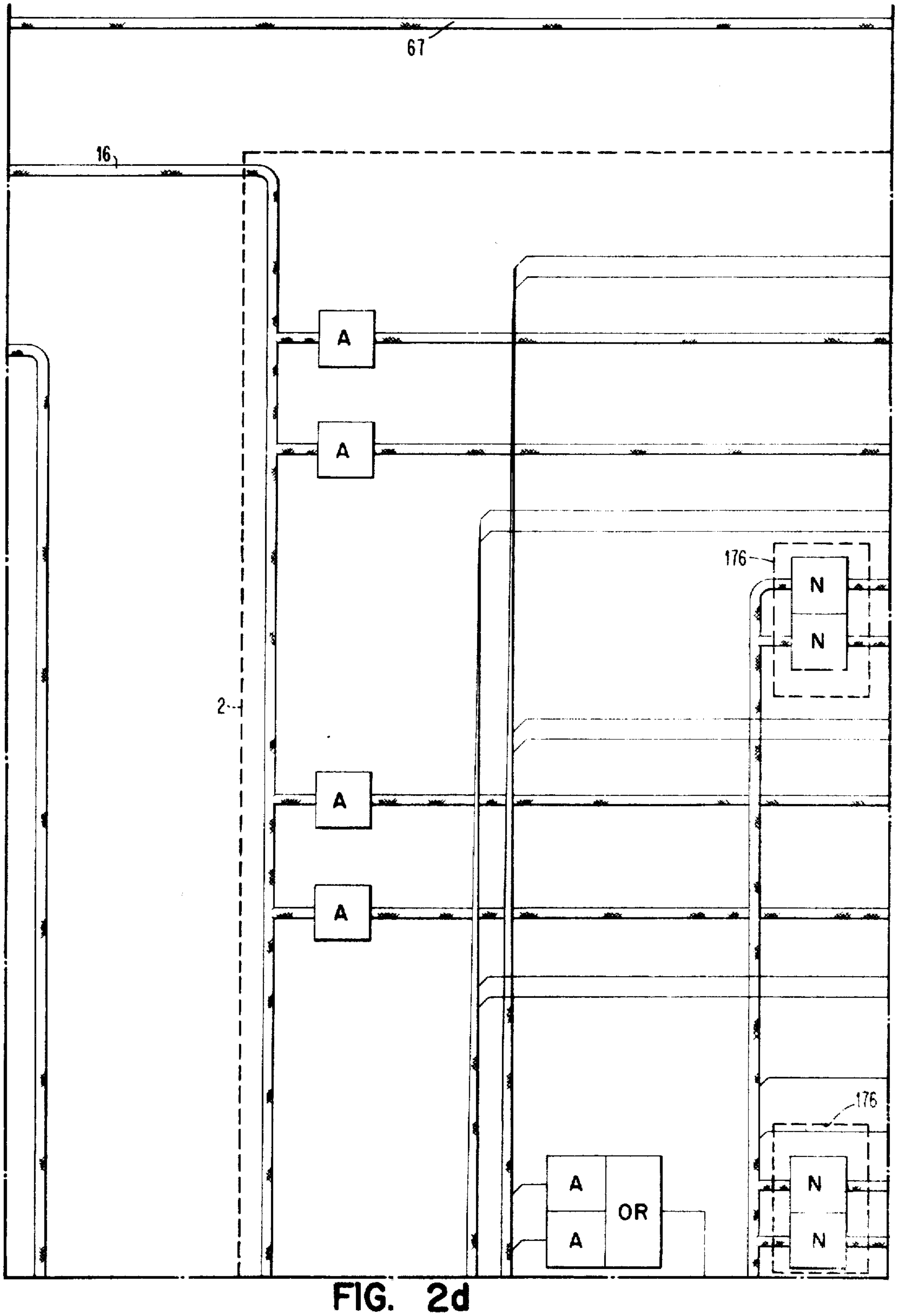
Figure 2E:
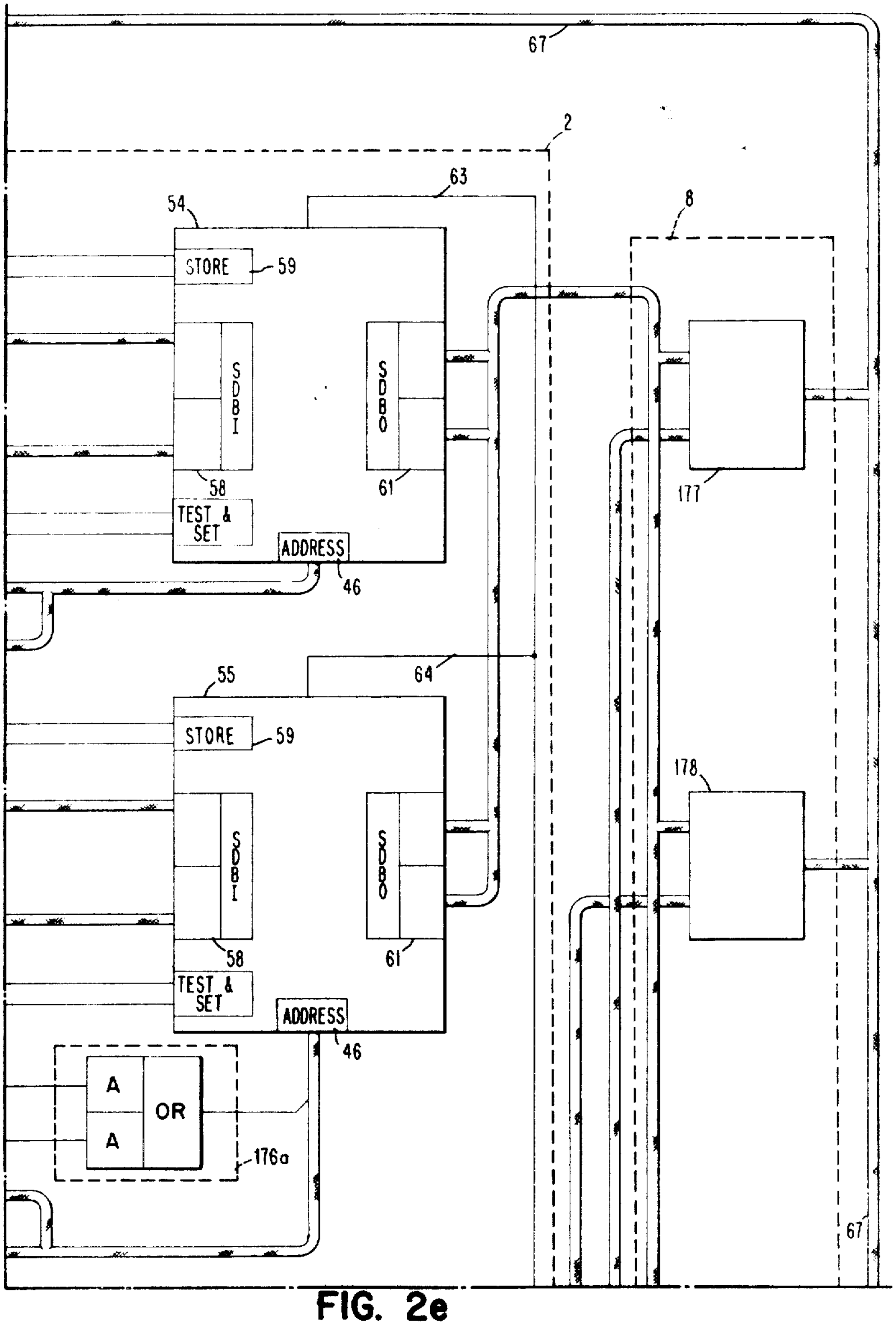
Figure 2F:
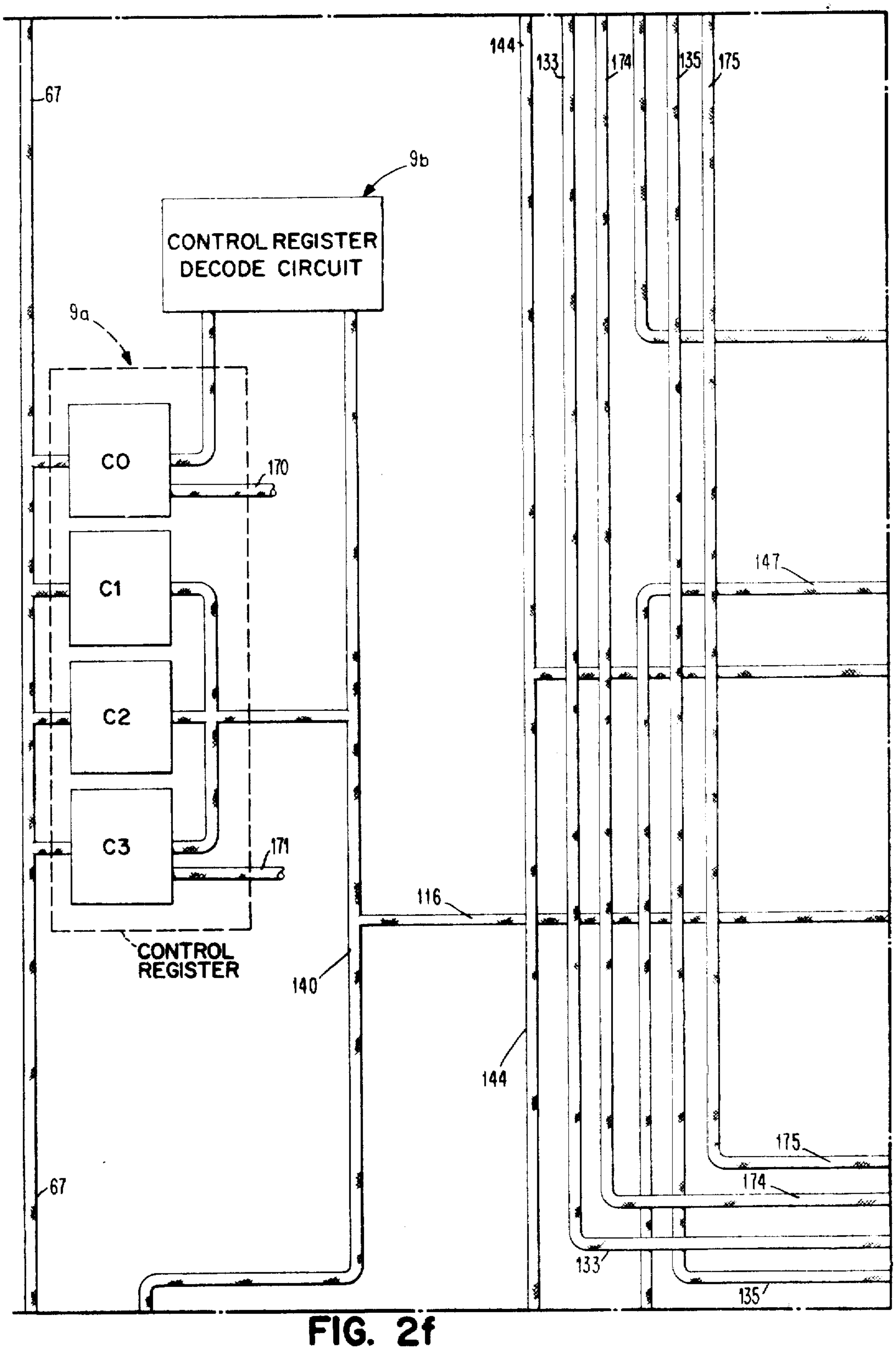
Figure 2G:
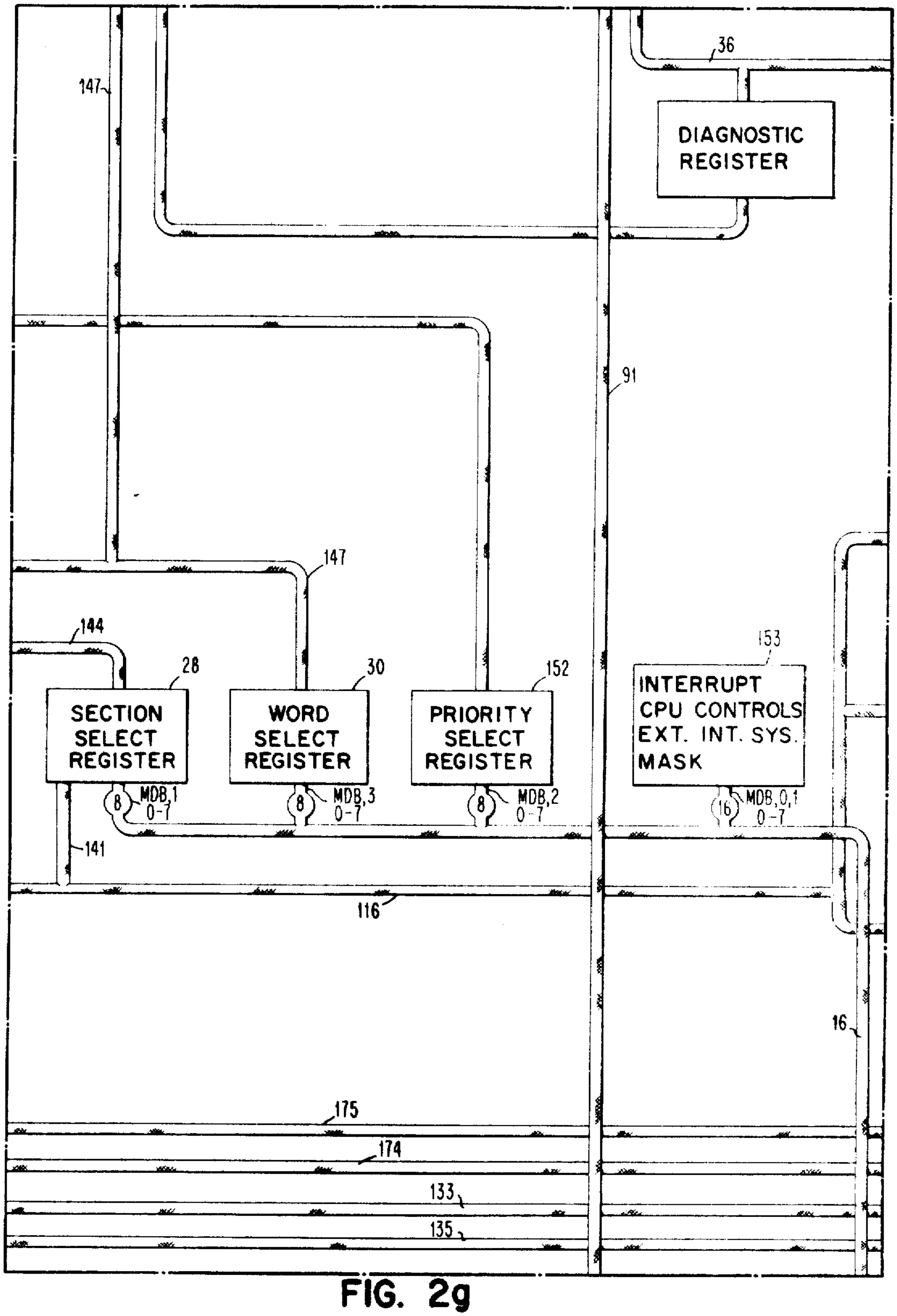

The external assembler 10, shown in FIG. 2*b*, has a separate sub-assembler **69*a* through 69*d* responsive to each sub-unit of information. As previously mentioned, the information carried by SDABO 67 is a word comprising four bytes; therefore, each sub-assembler 69*a* through 69*d* handles one byte. The external assembler accepts information from an additional plurality of sources. For example, information from a multiplex channel 70 is distributed among the sub-assemblers 69*a* through 69*d* by the buses 71*a* through 71*b* respectively. The multiplex channel also is 32 bits in width and the corresponding bytes are applied to the correspondingly numbered sub-assemblers in the external assembler 10. An additional input is from the various swtches on the console panel shown as a switch assembly 74. The switches 74 are able to enter information, especially addresses, into the main memory by way of the external assembler 10. Each switch has the capability of entering one hexadecimal digit. Since the hexadecimal digit requires four binary bits of information for description thereof, each sub-assembler is capable of accepting two switch positions. The switches are identified as AB, CD, EF, GH and are applied to the sub-assemblies 69*a* through 69*d* by the buses 75 through 78 respectively. Additional sources of information for application to the external assembler originate in a machine check register 79. The machine check register only finds access to the external assembler 10 by the sub-assembler 69*c* over a bus 80. The storage protect register is applied to the sub-assembler 69*d* by a bus 81**.

The output of the external assembler 10 is applied to the unit assembler 12 by a bus 82 capable of carrying a full unit of information or 32 bits separated into four byte channels. The unit assembler 12 comprises four sub-assemblers 83 through 86 each capable of handling a sub-unit of information or a byte. The respective channels of bus 82 are distributed among the sub-assemblies 83 through 86 by a plurality of buses 87 through 90 respectively. The unit assembler 12 receives a second series of input signals from the active storage circuit 17 over an active storage bus 91. Corresponding bytes from the active storage bus 91 are applied to the sub-assemblers 83 through 86 by a plurality of buses 92 through 95 respectively. In this manner, byte 0 from the ASBO 91 is applied to the sub-assembler 83 associated with byte 0 from the data bus 82. An additional input to the unit assembler 12 is applied thereto from the arithmetic logic unit 25 by the arithmetic bus 36. The bus 36 has the capacity of carrying in parallel the output from the ALU 25. In this embodiment, the bus carries eight data bits or one byte. This byte is applied selectively in parallel to the sub-assemblers 83 through 86 by a plurality of buses **96*a* through 96d** respectively.

The sub-assemblers 83 through 86 are gated to the sub-unit assembler 14 by a series of enabling signals on an accessing bus 98. These enabling signals are applied to the various sub-assemblers 83 through 86 by an equal plurality of gating lines 99 through 102 respectively. These gating signals not only enable the output from the associated sub-assembler 83 through 86 respectively, but also open the input gate to a respective sub-assembler 103 through 106 in the sub-unit assembler 14. In this manner, the contents of the sub-assemblers 83 through 86 can be gated to a sub-assembler 103 through 106 within the sub-unit assembler 14. The information from the unit assembler 12 is gated to the sub-unit assembler 14 over a bus 107. Again the bus 107 is capable of carrying four bytes or four sub-units of information from the output of the unit assembler 12. This bus 107 is applied to each of the sub-assemblies 103 through 106 of the byte assembly 14. The output from the sub-unit assembler 14 is the main data bus 16 which bus is capable of carrying four bytes of information or a full unit of information.

Figure 2H:
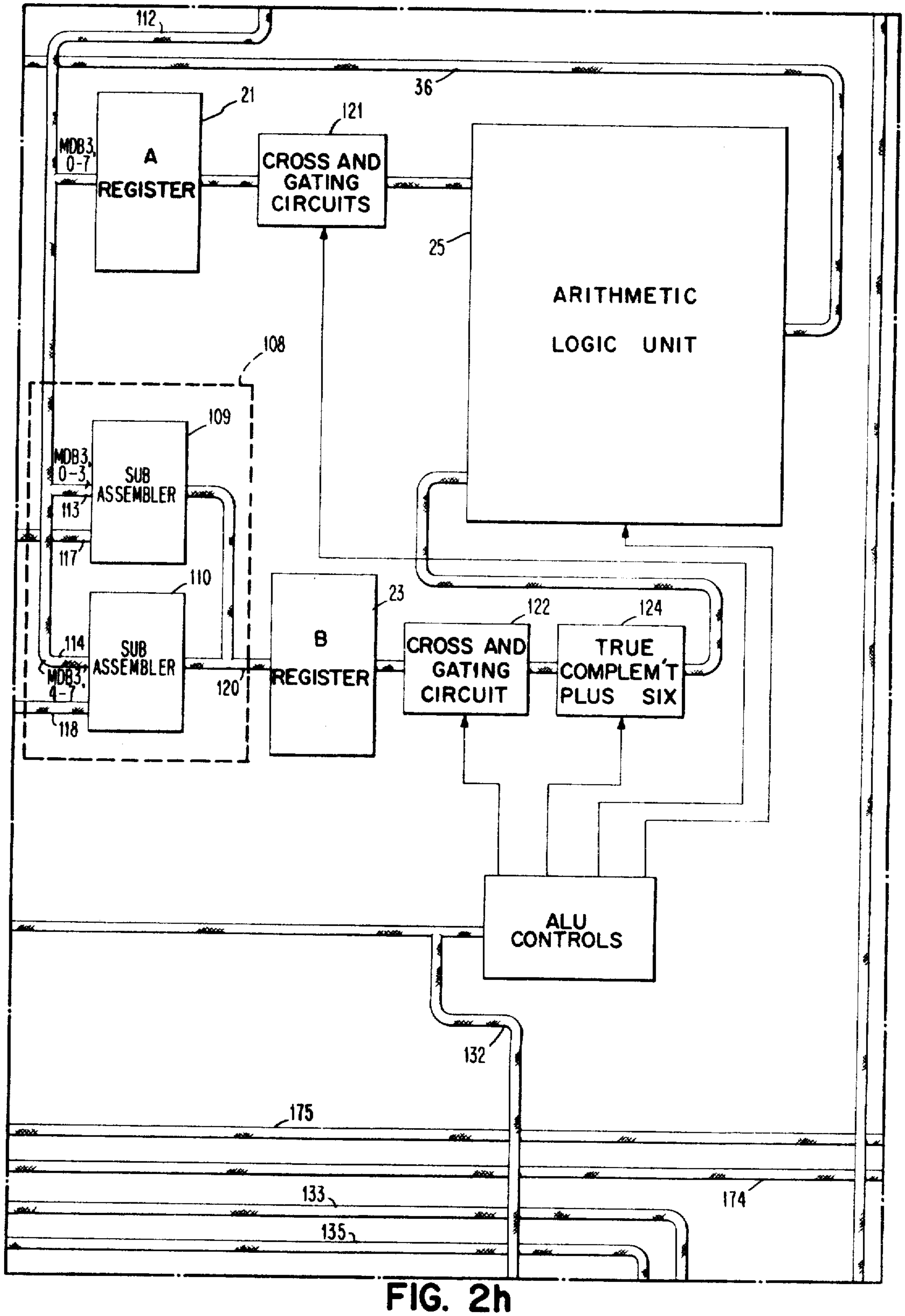
Figure 2I:
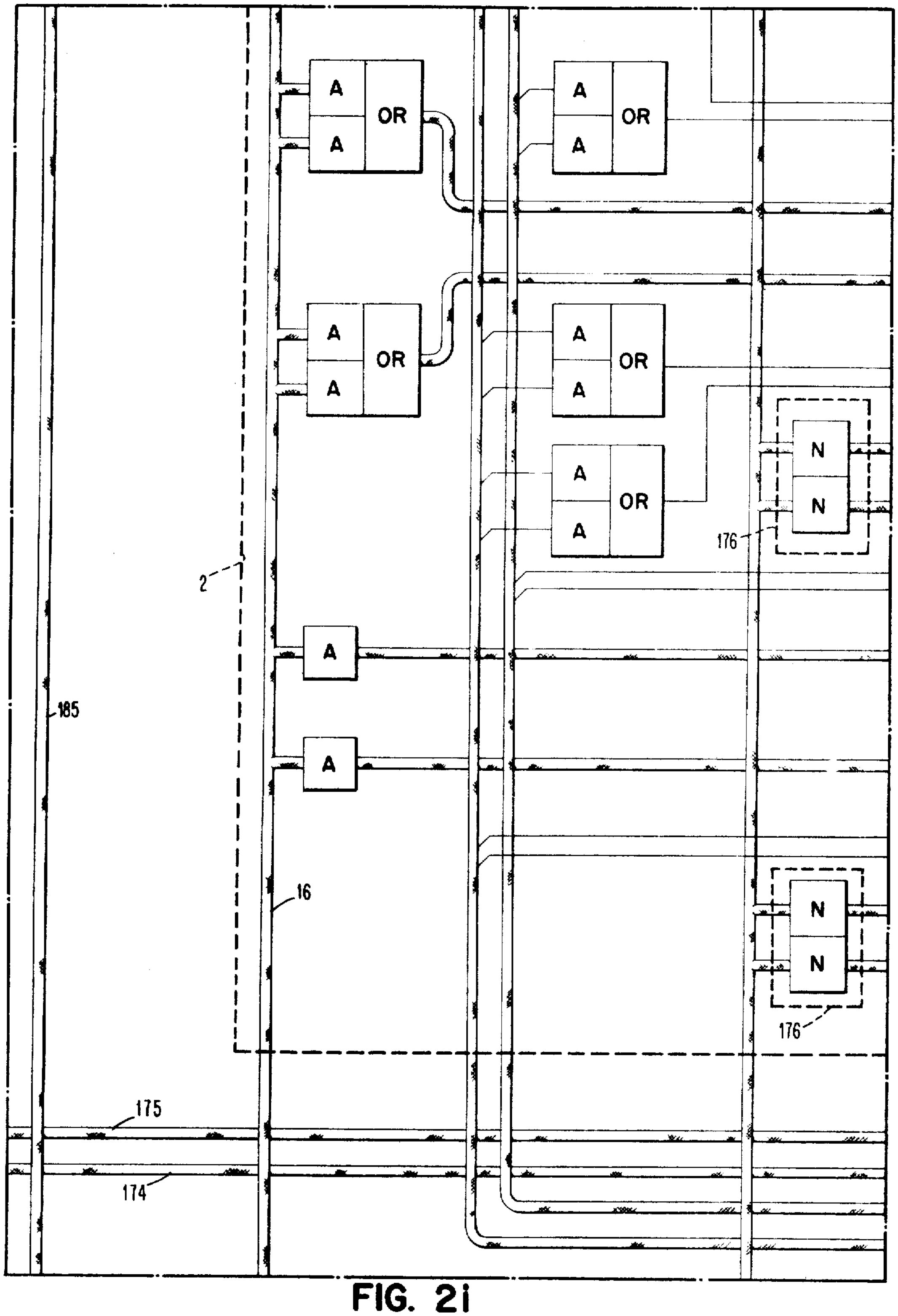
Figure 2J:
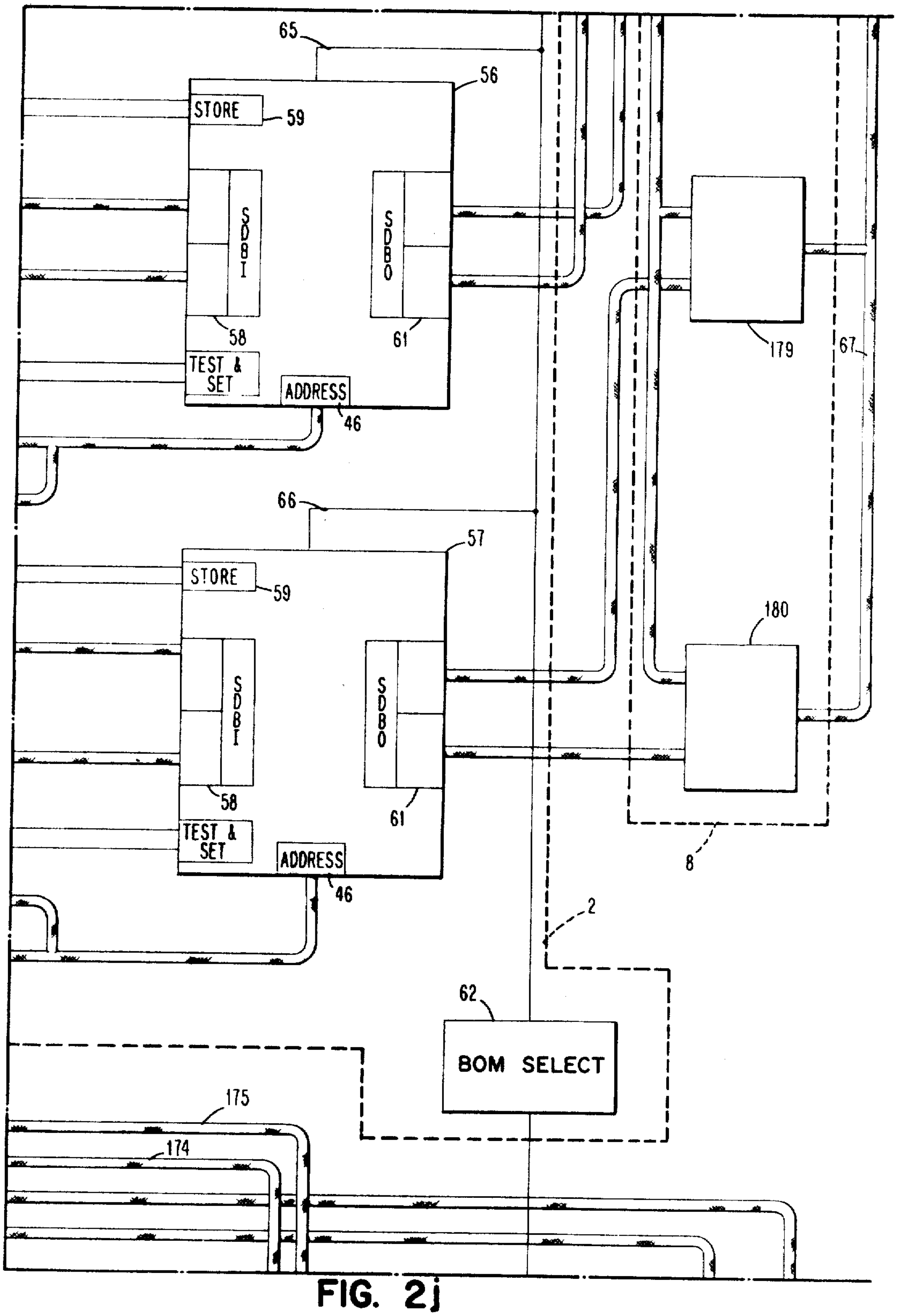

The output from the sub-unit assembler 14 is applied in parallel to the A register 21 and a B register assembler 108, shown in FIG. 2*h*. The B assembler 108 further comprises a plurality of sub-assemblers 109, and 110. The output from the sub-assembly 106 can be selectively applied to either of the sub-assemblers 109 and 110 over a bus 112 comprising additionally a plurality of buses, 113 and 114, applied to the respective sub-assemblies 109 and 110. The sub-assemblers 109 and 110 have a further series of input signals applied thereto over a control register bus 116. The bus 116 is three bytes or 24 bits in width and is applied selectively to either of the sub-assemblers 109 and 110 by an additional pair of buses 117 and 118 respectively. The output of the B assembler 108 is applied to the B register 23 by a B assembler output bus 120. The A register 21 and B register 23 inputs to the ALU 25 are applied thereto by well-known cross and partial gating circuits 121 and 122 respectively. The gating circuit 121 is capable of crossing the high four bits with the low four bits or shifting only the high or the low to the ALU 25. The gating circuit 122 is capable of shifting only the high or the low four bits of the B register 23 to the ALU 25. A true complement and a plus six circuit 124 is located intermediate the circuits 122 and 25. The details of any of these circuits are not necessary for the understanding of the present invention.

The mechanism for generating an address in main memory 2 is the memory address register 40 and the memory address assembler 38. The link address register 42 provides a mechanism for saving the last previous contents of the register 40 in response to a branching situation. The register 40 comprises a further plurality of registers 125 through 127 and each register has the capacity for storing one byte of address information and the bytes are called the M1, M2, and M3 bytes, respectively. The register 42 comprises a pair of individual byte registers 128 and 129. The memory address assembler 38 comprises two sub-assemblers 130 and 131. Like all other assemblers, the assembler 38 receives information from a plurality of input sources and also control signals from the control register **9*a* over a bus 132 and the bus 116. The register 9*a* comprises a unit of information consisting of four bytes of control data. The control register decode circuit 9*b* operates to decode the various inputs from the register 9*a***.

The output of the decode circuit **9*b*** is distributed throughout the remaining part of the circuitry to enable the AND to gate information from and into the remaining circuits of the machine.

The remaining inputs to the sub-assembler 130 comprise the output of the register 128 as applied by a bus 133, and the output of the unit sub-assembler 85 as applied thereto by the bus 16 and a further bus 134. The contents of the bus 133 are applied also to sub-assembler **69*c*. The remaining inputs to the sub-assembler 131 comprise the output of the register 129 as applied by a bus 135, the output of a status register 136 as applied by a bus 137 and the output of the sub-assembler 86 as applied thereto by the bus 16 and a further bus 138. The contents of the bus 135 are applied also as an input to the sub-assembler 69*d***.

The memory address assembler 38 selectively gates data bits from the main data bus 16, from the link register 42, from the current *c* control word, or the status register 136 into the register 40.

Figure 2K:
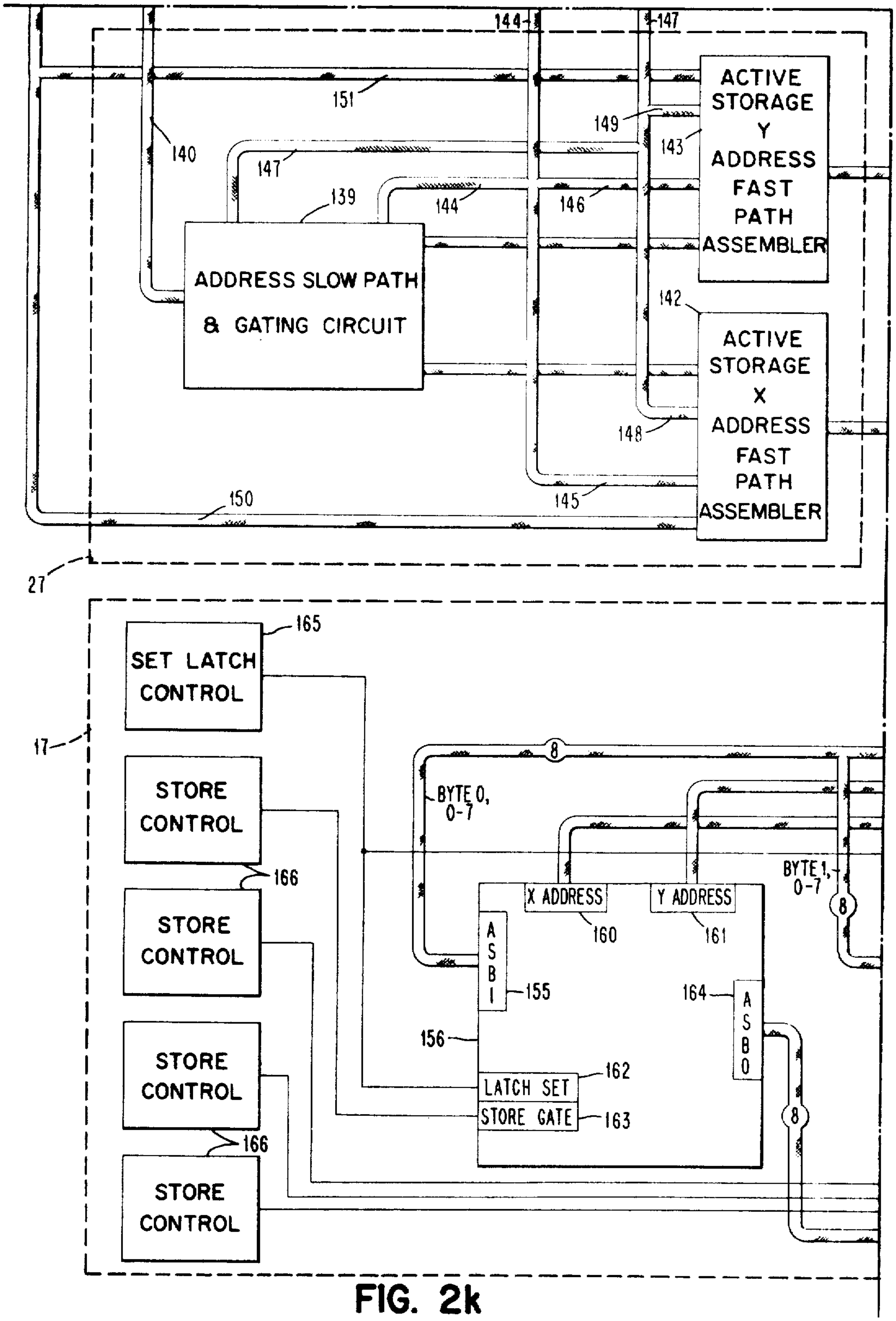
Figure 2L:
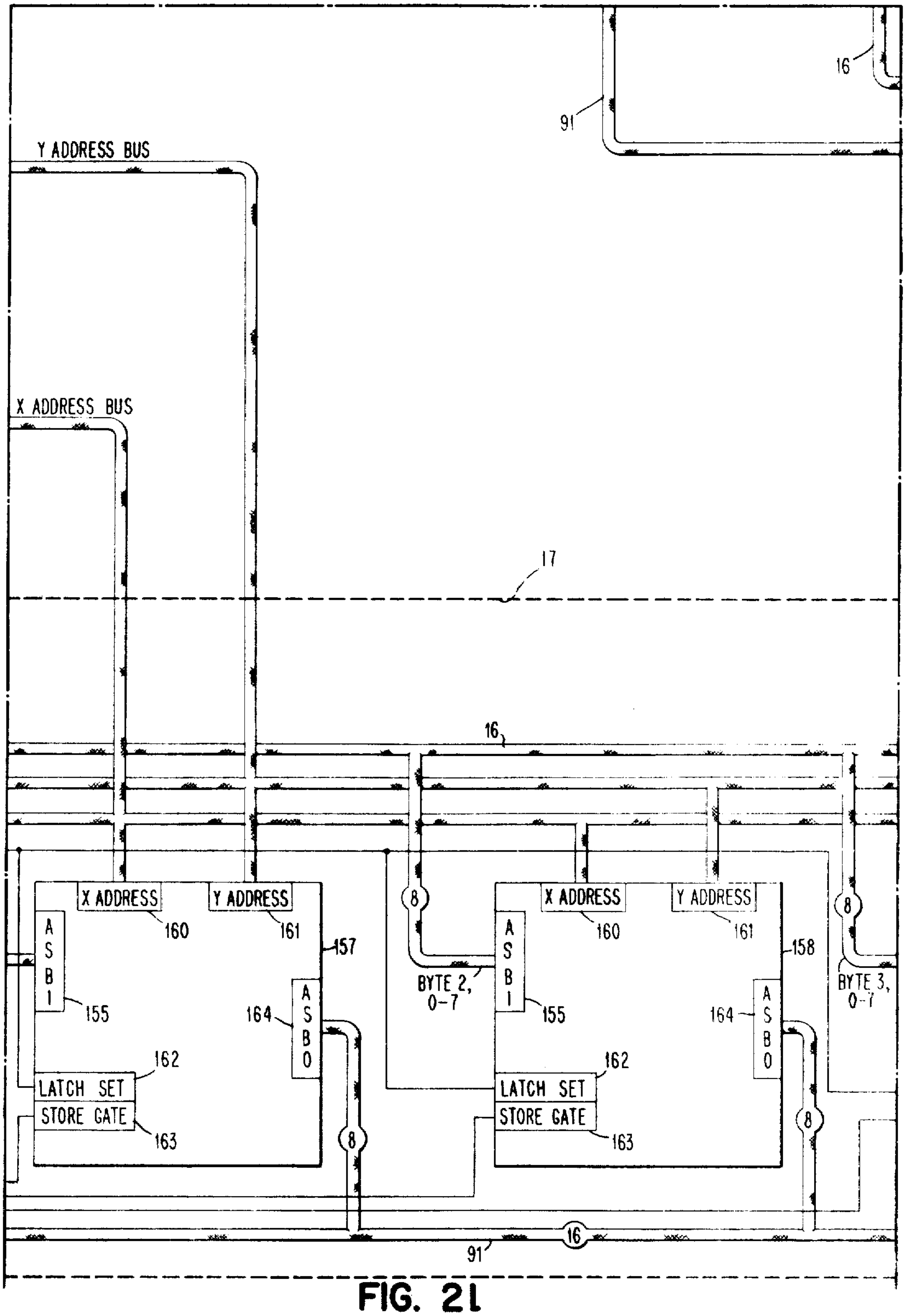
Figure 2M:
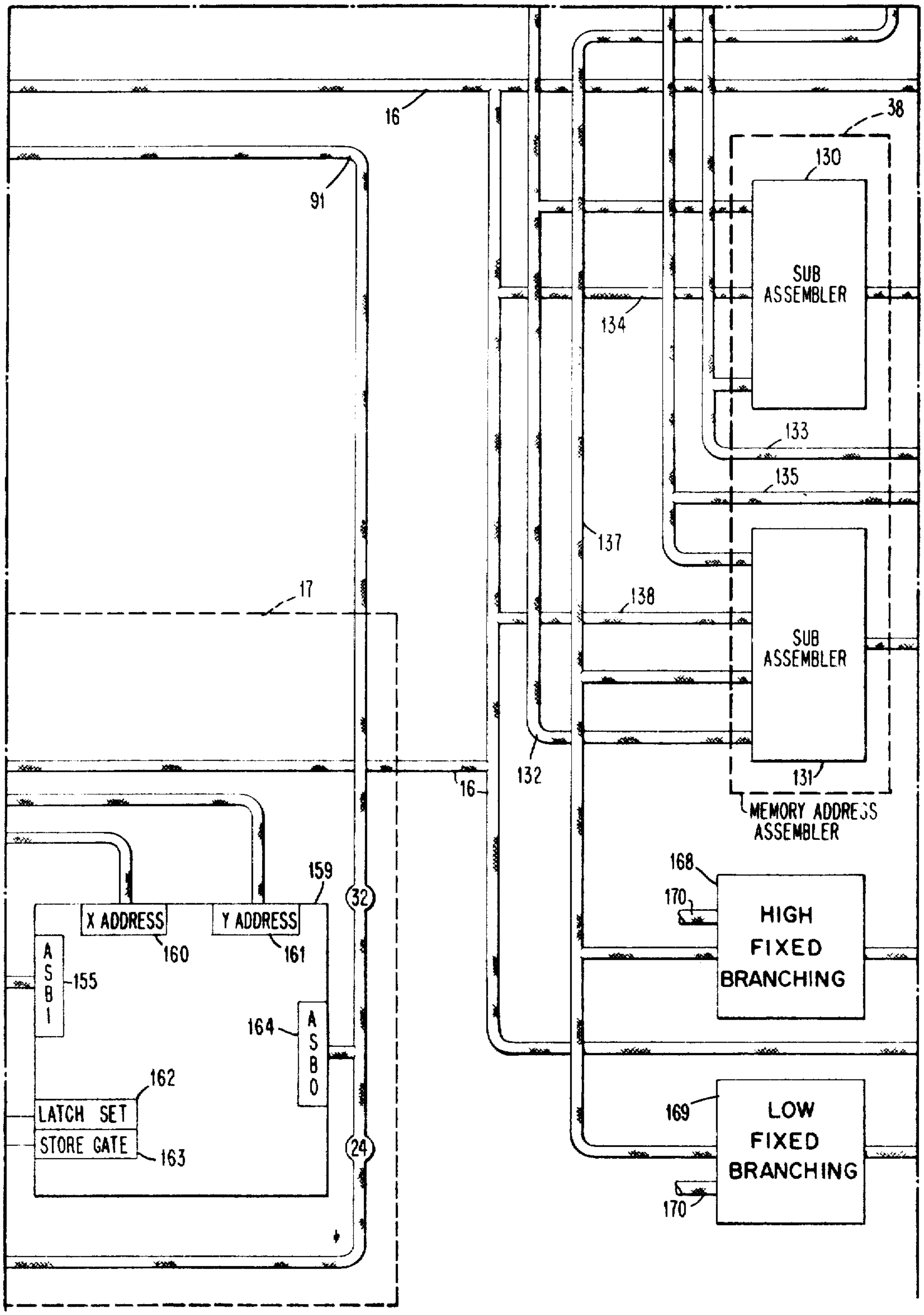

The output of the register **9*a* is applied to an address slow path and gating circuit 139 within the active storage address assembler 27**, shown in FIG. 2*k*, and the section select register 28 by the bus 116 and a plurality of lines 140 and 141 respectively. The output of the circuit 139 is applied to an active storage X address assembler fast path circuit 142 and to an active storage Y address assembler fast path circuit 143. The circuit 142 generates the X axis address line and the circuit 143 generates the Y axis addressing lines. Together they select a single word from the active storage memory 17. The register 28 furnishes information to the circuits 142 and 143 over a bus 144 and a plurality of branch buses 145 and 146 respectively. The bus 144 is also connected as an input to the sub-assembler **69*b* in the external assembler 10. An additional input to the circuits 142 and 143 is applied thereto from the word select register 30 over a bus 147 and a plurality of branch buses 148 and 149. Additionally, the bus 147 is employed as an input to the sub-assembler 69*d* in the external assembler circuit 10. The final inputs to the circuits 142 and 143 originate from the storage data assembler 8 and applied therefrom over the storage data assembler bus out 67 and a plurality of branch buses 150 and 151**.

The main data bus 16 acts as input bus for a plurality of additional circuits. The sub-unit accessing and modifier circuit 19 is responsive to the main data bus byte 2, bits 0–7. The status register 136 is responsive to the main data bus byte 0, bits 0–7. The word select register 30 receives input information from the main data bus 16, byte 3, bits 0–7. The section select register 28 is responsive to the main data bus byte 1, bits 0–7. A priority select register 152 is responsive to the main data bus 16, byte 2, bits 0–7. An interrupt and control register 153 is responsive to the main data bus 16, bytes 0 and 1. Other circuits responsive to the main data bus 16 are a branch control circuit 154 and the active storage bus in (ASBI) circuit 155.

The active storage circuit 17 comprises a second plurality of basic operating modules 156 through 159. The basic operating modules 156 through 159 need not have the same capacity as the previously mentioned modules 54 through 57. Their resemblance resides in the fact that a larger memory system comprises a plurality of smaller similarly constructed basic operating modules.

Each basic operating module includes in addition to the ASBI 155, an X address circuit 160, a Y address circuit 161, a latch set circuit 162, a store gate 163, and an active storage bus out (ASBO) circuit 164. The information to be stored in a basic operating module is applied to the ASBI 155 and it is stored at the addressable location designated by the contents of the circuits 160 and 161. The X address and Y address circuits together select a single storage location into which the contents of the ASBI 155 is to be stored. In those situations when the information is to be interrogated from the basic operating module 156, the contents of the X address and Y address select the location and the contents are read out into the ASBO circuit 164. The latch set circuit 162 operates to enable the write out procedure while the store gate 163 operates to enable the storage procedure.

Each of the basic operating modules 156 through 159 stores a unit of information. This unit of information need not be the same length as the unit of information held in the basic operating memory 54 through 57. The unit of information stored in a basic operating module, such as 156, is eight binary bits or one byte. The address information stored in the circuits 160 and 161 of each basic operating module 156 through 159 is applied to these circuits in parallel from the circuits 142 and 143. This means that one byte of information is addressed in each module simultaneously. One byte of information from each basic operating module is transferred from the ADBI 155 associated with each basic operation module or transferred onto the ASBO 164 and the bus 91.

In reviewing then, when a single address is furnished from the circuits 142 and 143, a full word of information, four bytes, are read out from the respective modules 156 through 159 and placed onto their respective locations in the active storage bus 91. This full word of information is applied to the sub-assemblers 83 through 86 over the plurality branch buses 92 through 95. Corresponding bytes from the BOM's 156 through 159 are applied to sub-assemblers 83 through 86 respectively. The latch set circuits 162 are enabled from a set latch control circuit 165. The store gate circuits 163 are enabled from a plurality of store gate control circuits 166, one of which circuits is associated with each BOM 156 through 159.

Figure 2N:
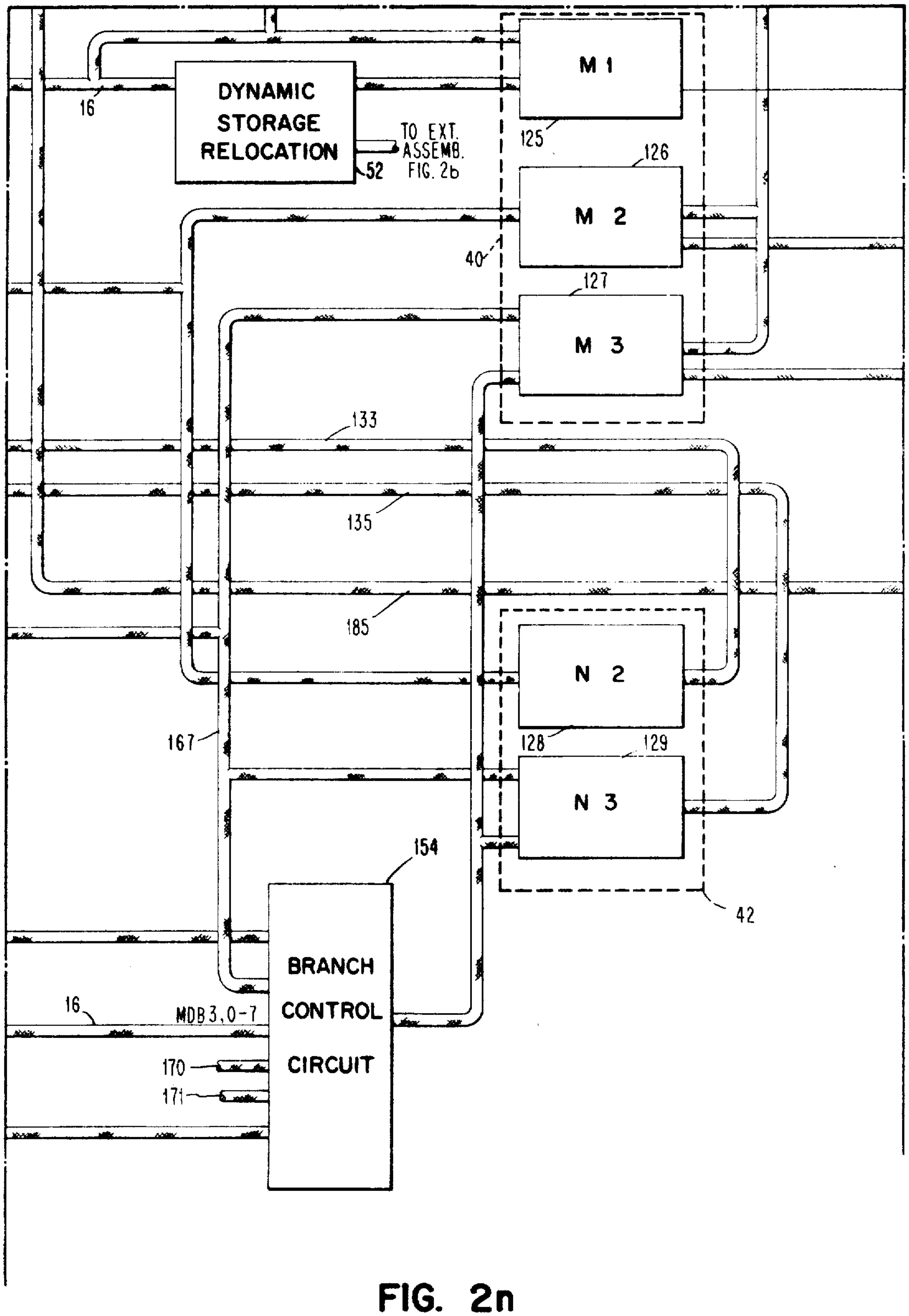

The branch control circuit 154, shown in FIG. 2*n*, is equipped with a plurality of input signals. One previously mentioned set of signals is from the main data bus 16, byte 3 position. The output from the sub-assembly 131 is applied to the branch control circuit 154 over a bus 167. A high branch circuit 168 and a low branch circuit 169 also furnish input signals to the branch control circuit 154. Output signals from the decode circuit **9*a* are applied to the branch control circuit 154 over a plurality of buses 170 and 171**.

The register 40 comprises three sub-unit registers 125 through 127 as previously mentioned. Each register holds eight binary bits of information, but only the registers 126 and 127 are employed for selecting a single storage location within the basic operating modules 54 through 57. The bit positions in the register 125 are available for expansion of the present capacity exhibited by the basic operating modules 54 through 57. When additional storage is placed into the system, the operation of the register 125 will follow the general format as set down for the remaining registers. The outputs from the registers 126 and 127 are applied to a pair of replacement registers 172 and 173 respectively. During certain branching operations, it is necessary to have a parallel back up system as furnished by the pairs of registers 128 and 129 and 172 and 173. The output from the registers 172 and 173 is applied to the sub-assemblers 67 and 68 respectively in the external assembler 10 by a pair of branch buses 174 and 175 respectively.

The outputs from the registers 126 and 127 are applied in parallel to the address circuit 46 of each of the basic operating modules 54 through 57 by an additional inverter circuit 176. Associated with the basic operating module 55 and the address circuit 46 associated therewith, the bit position 0 of the register 126 is responsive to a special assembler **176*a*. The storage data assembler 8 comprises a plurality of sub-unit registers 177 through 180. The storage capacity of each of these last mentioned registers is one byte and each register is responsive to selected bytes of information from each of the basic operating modules 54 and 55. Each access to the memory 2 brings out four bytes of information, two bytes from each of the modules 54 and 55. The basic operating modules 56 and 57 are shown connected to the registers 177 through 180 in one additional manner when it is desired to expand the storage capacity of the memory 2**.

The output from the register 127 is applied to a storage control circuit 181 by an AND gate 182. The output from the AND gate 182 is a plurality of enabling signals connected to a test and set circuit 183. Enabling signals from the circuit 183 can be used singly or in combination to effect the well-known test and set operation on the BOM's 54 through 57. A remaining input to the storage control circuit 181 originates from a store under mask circuit 184 which is connected to the register 19 by a bus 185. A further input to the circuit 181 is from the switch assembly circuit 74 shown in FIG. 2*a* over a bus 186.

Referring to FIGURE 3, there can be seen the hardware aid to the dynamic storage relocation technique designated to implement and increase the operating characteristics of a time-sharing system employing dynamic storage relocation. The main data bus 16, being the output path of the assembler 14, contains the logical addresses developed within the programming portion of the system for specifying the storage location in main store 2 at which a particular piece of informtion is located. However, as we have seen in an operating system operating in a time-sharing mode, data is only stored in main storage when this associated program is selected for execution, either immediate or on a stand-by basis. The address on the main data bus 16 comprises a first half for storage into a relocate register high and a second half for storage into a relocate register low. A plurality of registers 300, 301 and 302 are shown connected by gating circuits 303, 304 and 305 respectively to the main data bus 16. A plurality of registers 306, 307 and 308 are also shown connected to the main data bus 16 by an additional plurality of gates 309, 310 and 311 respectively. When the logical address is gated out of the assembler 14 onto the main data bus 16, a first portion is gated directly to the memory address register 40 byte position 3, register 127, and the upper half of byte position 2, register 126*a*. The upper half is gated into one of the registers 300, 301, or 302 depending upon whether the address is associated with an instruction, a second operand or a first operand, respectively. The register 300 is associated with an instruction and is selected by the gate 303. The register 301 is associated with the second operand address and is loaded by the gate 304. The register 302 is associated with the first operand and is loaded by the gate 305. Three registers are provided because after the corresponding register is loaded with its address contents, it remains in storage and is not destroyed after each reference to memory However, the contents of only one of the registers 300 to 302 is involved with the DSR routine at any one moment in time. Accordingly, a single compare circuit 314 is employed for comparing the contents of one of the registers 300 to 302 with the contents of a corresponding portion of the main data bus 16. The selection among the registers 300 through 302 is achieved through a gating circuitry 316. When the contents of the instruction relocate register do not match the contents on the main data bus 16, one of a possible two mis-matches can be identified. Additionally, it is possible to identify simultaneously both mis-matches. An instruction mis-match latch 318 indicates that the address mis-match occurs in a corresponding section of the logical address. A page mis-match latch circuit 320 indicates that the address mis-match occurred in a second portion of the logical address. Assuming that a mis-match occurred, the routine to be described hereinafter is followed for addressing various tables located in main memory for obtaining the relocated address at which the logical address is attempting to identify. The relocated or actual address is then loaded by the data bus 16 into the registers 306, 307 and 308 depending upon whether the logical address is associated with an instruction, a second operand or a first operand respectively. After the corresponding register 306 through 308 is reloaded with the actual address in question, the instruction causing the DSR routine is again executed. This re-execution is controlled by a branch and link routine. During re-execution a compare equal should be indicated since the logical address portion of the re-executed instruction which participates in the compare operation was loaded into the corresponding register 300 to 302 during the last access to the DSR mechanism. Thereafter, the corresponding contents of the registers 306 through 308 are loaded by a gating circuitry 322 into the remaining portions of the memory register 40 byte position 1, register 125 and the lower half of byte position 2, register 126.

Referring to FIGURES 4*a* through 4*i*, there can be seen a more detailed schematic diagram of the circuitry shown in FIGURE 3. The registers 300, 301 and 302 are loaded by the gates 303, 304 and 305 and the control signals on the lines 324, 325 and 326 respectively.

For control purposes, the address indicia carried by the MDB 16 is represented by TRUE and COMPLEMENT signals. Accordingly, the control signals on the lines 324, 325 and 326 are inverted in inverters 327, 328 and 329 respectively while the TRUE gating signal on the lines 324 through 326 gate their corresponding TRUE address indicia signals on the MDB 16, the COMPLEMENT gating signals from the inverters 327 through 329 on a plurality of lines 330, 331 and 332, respectively, gate the COMPLEMENT address indicia signals on the MDB 16.

Each of the registers 301, 302 and 303 is identical. These registers comprise a plurality of storage positions 333 comprising input AND gates 334 and 335 and a latched back OR circuit 336. The latched OR circuit 336 is the storage element. Each of the AND gates 334 is responsive to a plurality of input signals, one of which is the COMPLEMENT gating signal from one of the respective inverter circuits 327 through 329, and the second of which is the COMPLEMENT address indicia signal from one of the respective bit positions of the MDB 16. Each of the AND gates 335 is responsive to a plurality of input signals, one of which is the TRUE gating signal from one of the respective AND gates 303 through 305, and the second of which is the TRUE address indicia signal from the respective bit position of the MDB 16. The gates 303 through 305, as previously mentioned, control the input gating while the output gating is controlled by the gate 316 having input gating signals available on a plurality of lines 337, 338 and 339. The enabling signal on the line 337 is associated with the decoding of the logical address of an instruction, and it gates a corresponding bit storage position of the register 300 through the gate 316 onto a relocate bus 340. The enabling signal on the line 338 is associated with the decoding of the logical address associated with a first operand, and it gates a corresponding bit storage position of the register 302 through the gate 316 onto the relocate bus 340. The enabling signal on line 339 is associated with the decoding of the logical address associated with an operand and gates a corresponding bit storage position of the register 303 through the gate 316 onto the relocate bus 340.

Figures 4, 4E:
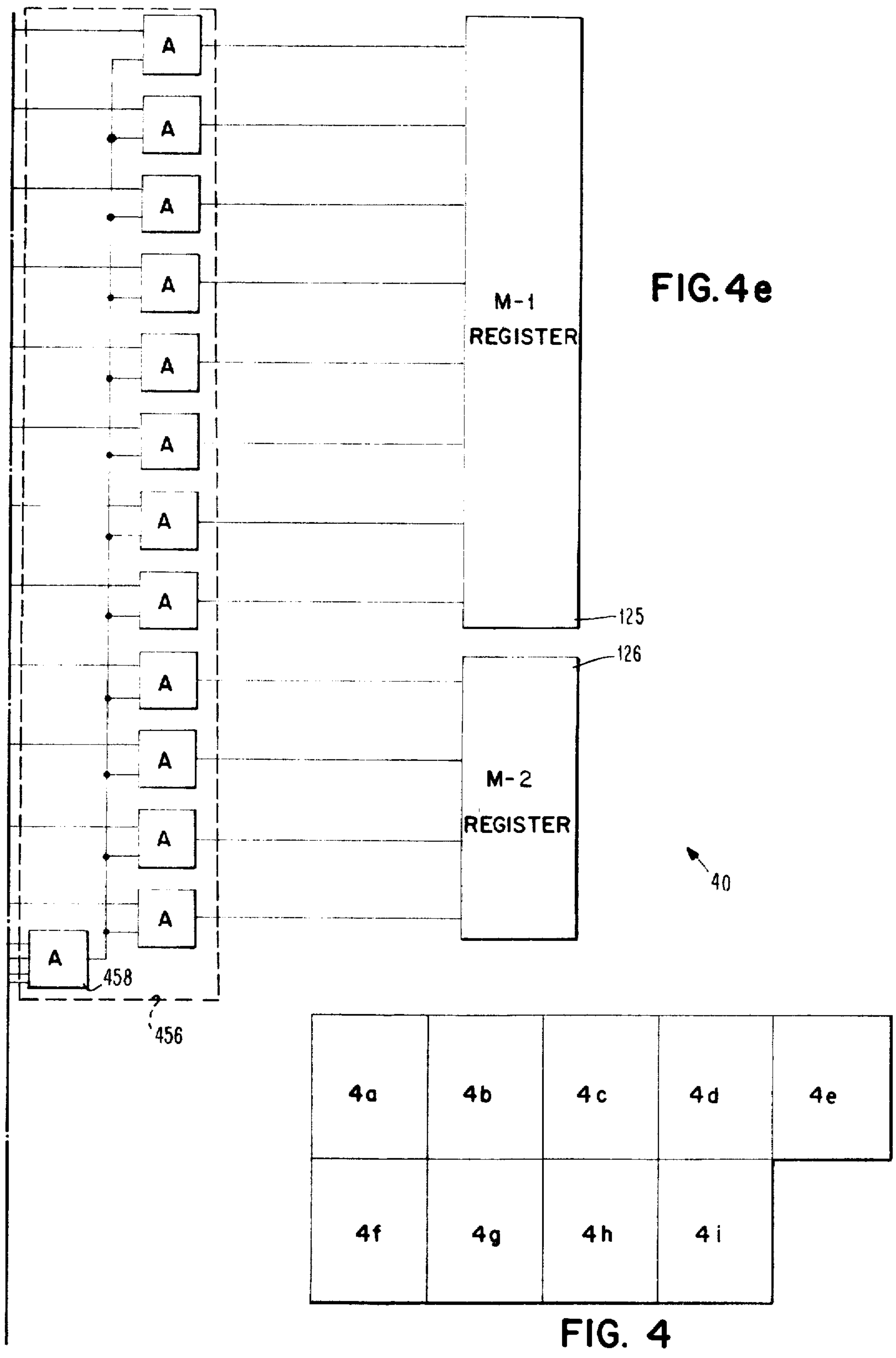
FIG. 4 shows the arrangement of FIGS. 4*a* through 4*i*.
FIGS. 4*a* through 4*i* are a detailed diagram showing the preferred embodiment of the dynamic storage relocate mechanism employed herein.
Figure 4A:
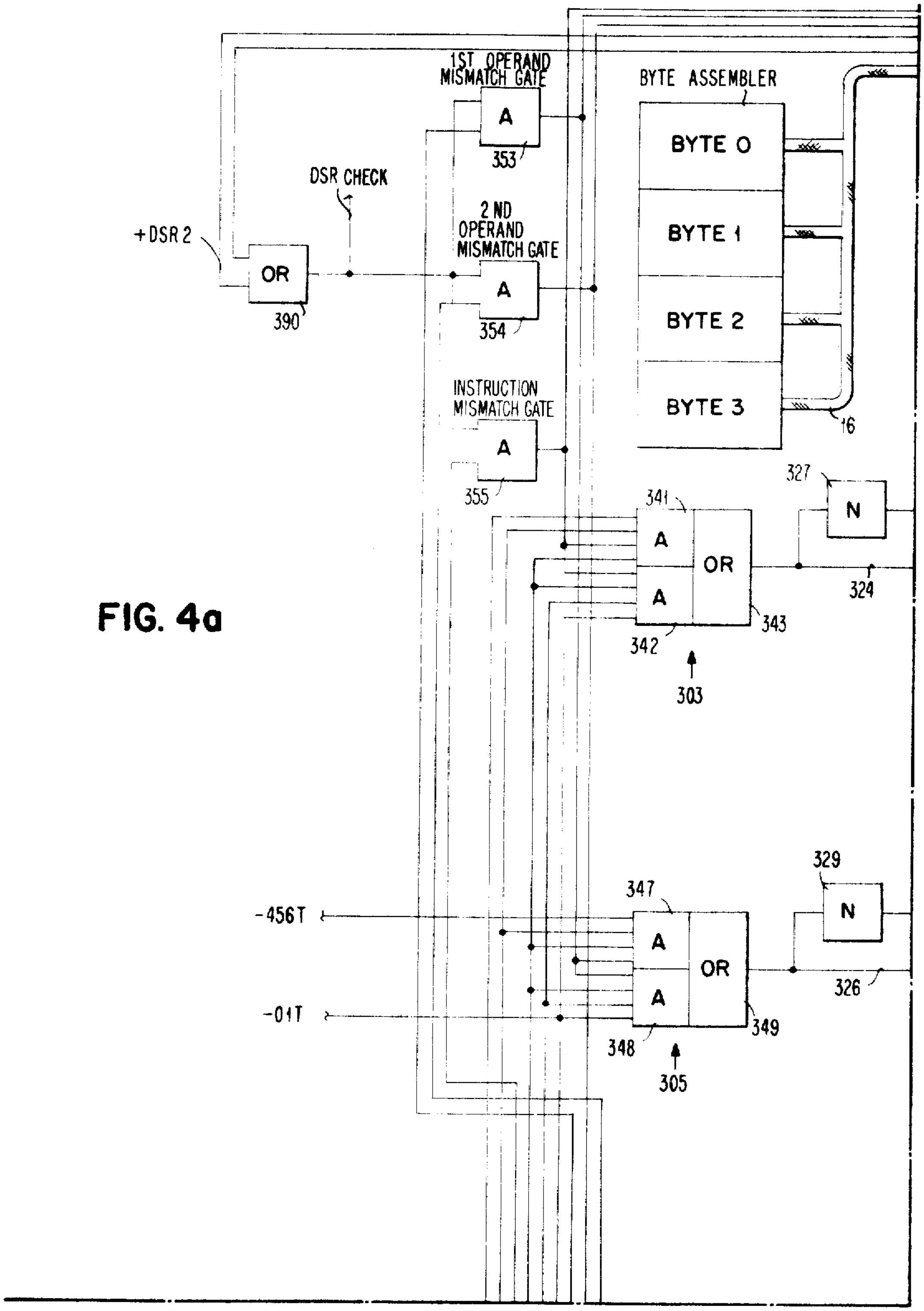

Referring to FIGURE 4*a*, the gate 303 comprises a pair of input AND gates 341 and 342. The outputs from the AND gates 341 and 342 are applied to an OR gate 343. The gate 304, shown in FIG. 4*f*, comprises a plurality of input AND gates 344 and 345. The outputs from the AND gates 344 and 345 are combined in an OR gate 346. The gating circuit 305 is equipped with a plurality of input AND gates 347 and 348 respectively. The output signals from the AND gates are applied to an OR gate 349. A first enabling signal is furnished by a storage cycle decode circuit 350, shown in FIGURE 4*f*, for application to all the input AND gates 341, 342, 344, 345 and 347 and 348. A STORAGE WRITE enabling signal is available from a circuit 351, shown in FIGURE 4*f*, for application to one input AND gate in each of the gating circuits 303,

304 and 305. The AND gates 341, 344 and 347 are employed for writing information into the registers 301 through 303 during storage write cycles. A STORAGE READ enabling signal is available from the circuit 352 for application to the input AND gates 342, 345 and 348. This enabling signal is associated with placing information into the registers 301 through 303 during a storage read cycle. The fourth enabling signal associated with each of the input AND gates is generated by a plurality of mis-match gates 353, 354 and 355 shown in FIGURE 4*a*. The gate 353 indicates a first operand mis-match operation and furnishes an enabling signal to the AND gates 347 and 348. The gate 354 indicates a second operand mis-match operation and applies its enabling signal to the input AND gates 344 and 345. The mis-match gate 355 indicates an instruction mis-match and applies its enabling output signal to the AND gates 341 and 342. The 4, 5, 6 timing signal is applied to the AND gates 341, 344 and 347 and the 0, 1 timing signal is applied to the AND gates 342, 345 and 348. For any one combination of input enabling signals, a gating signal is generated on the lines 324, 325 and 326 for transferring the contents of the main data bus 16 into the storage elements of the storage registers 300, 301, and 302.

Figure 4B:
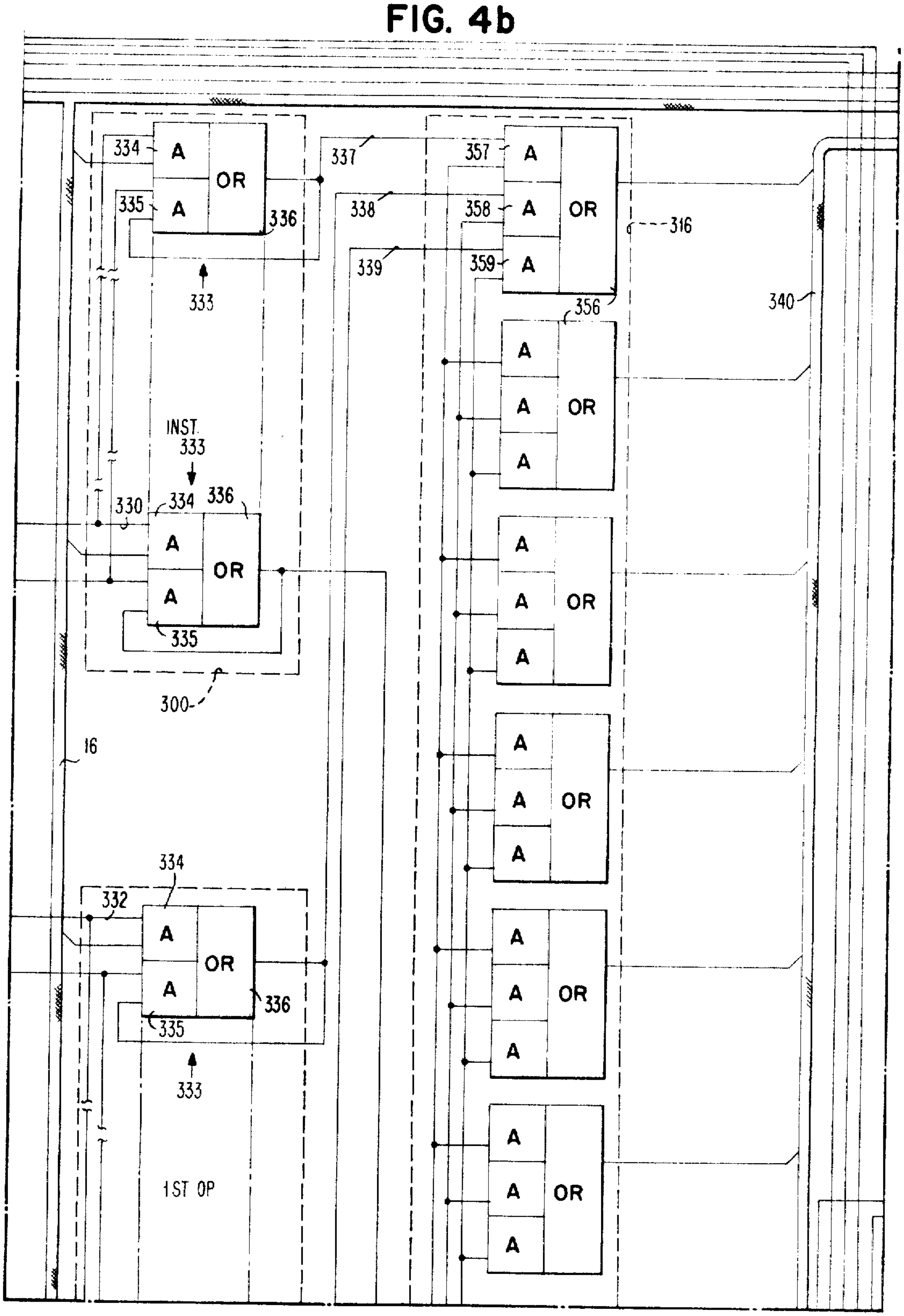
Figure 4C:
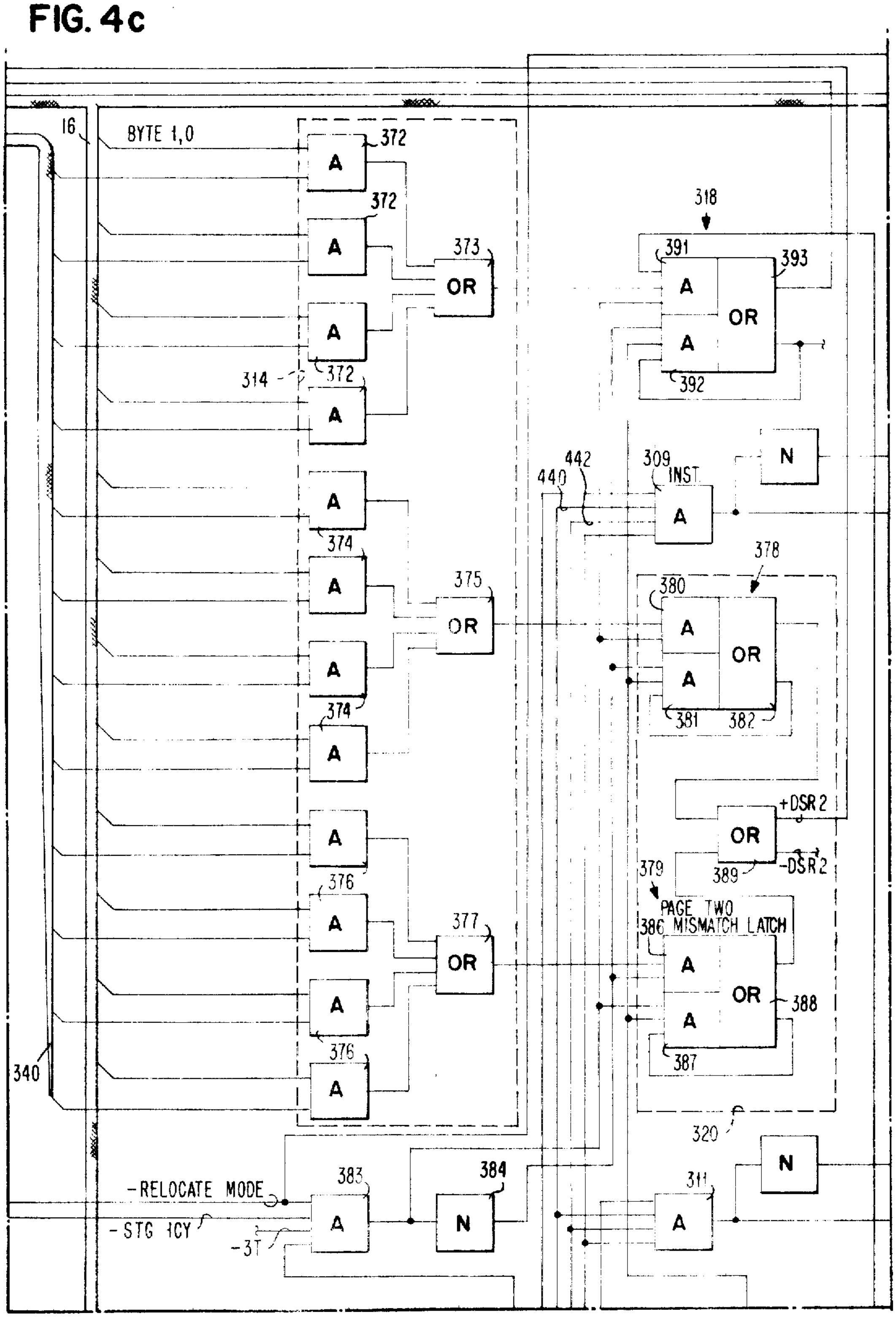
Figure 4D:
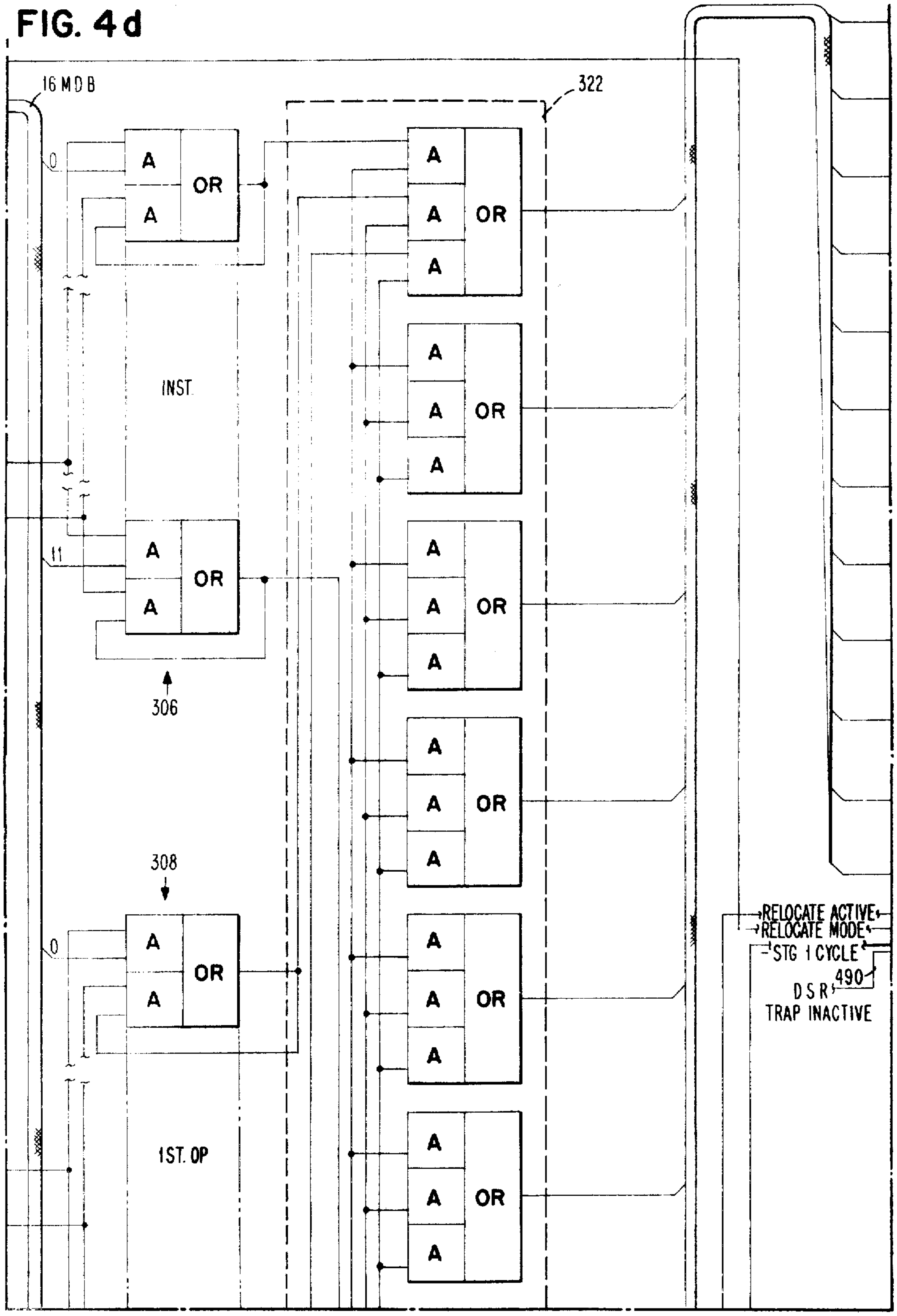
Figure 4F:
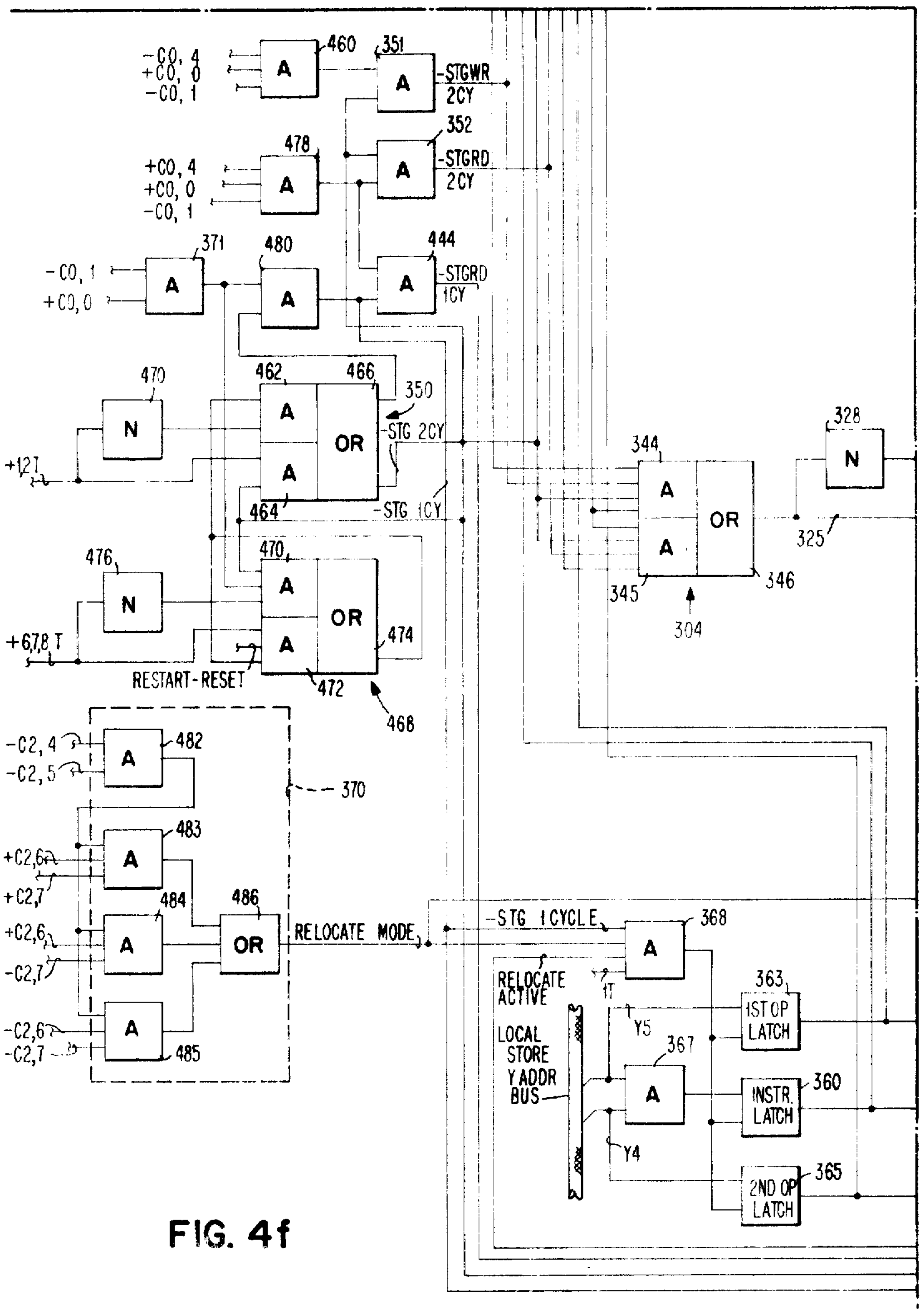
Figure 4G:
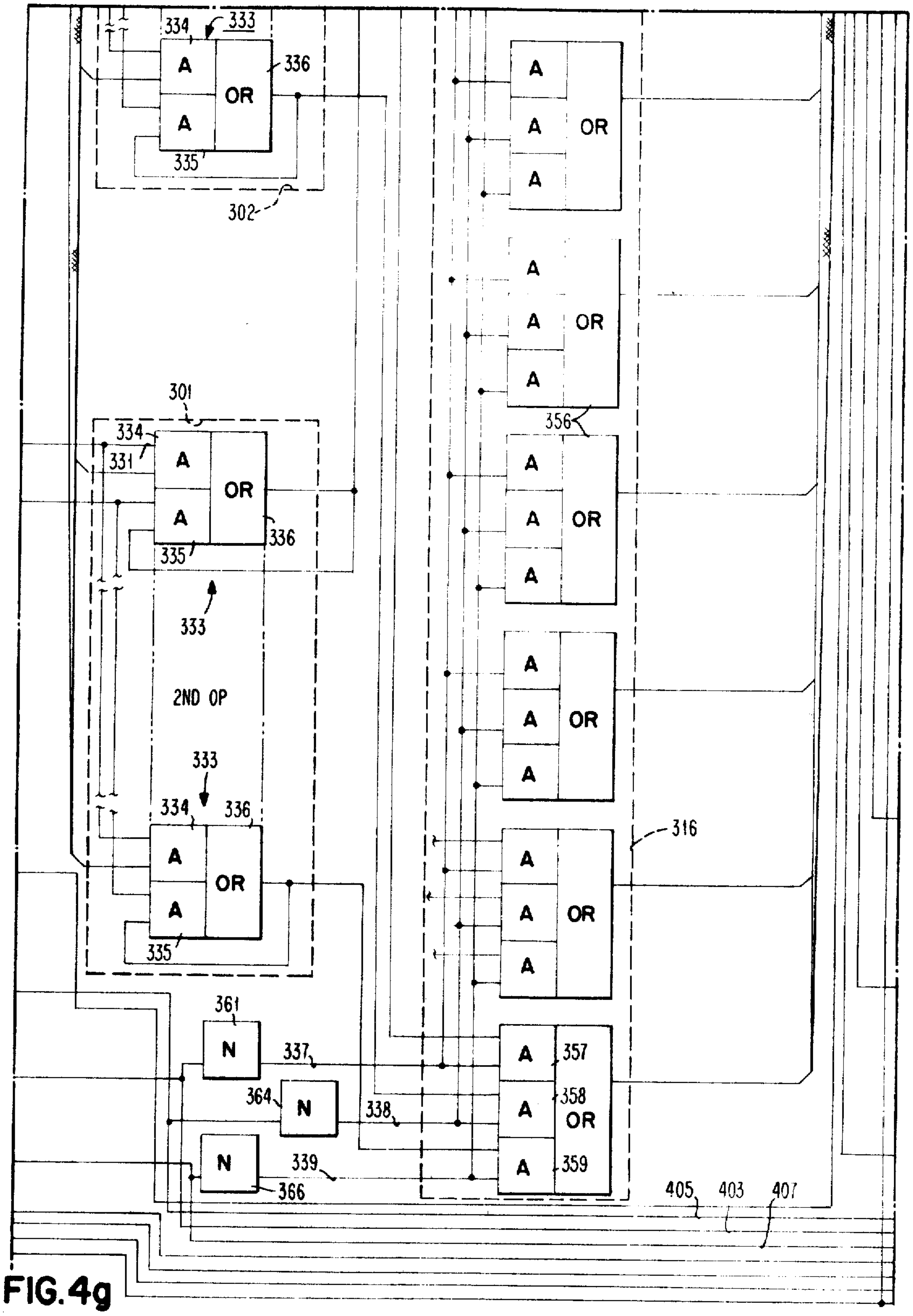

Referring again to the gating circuit 316 shown in FIGURES 4*b* and 4*g*, this circuit has as many stages 356 as there are stages in one of the relocate registers. For example, there are twelve stages in the register 300 and there are twelve stages in the gating circuit 316. Each of the stages 356 comprises three input AND gates 357, 358, and 359. Each of the stages 356 is identical so only one is described in detail. A respective input AND gate, for example 357, in each of the stages 356 is connected to its respective position in the instruction relocate register high 300. An additional input AND gate, for example 358, is connected to its respective storage position in the first operand relocate register high 302. The remaining AND gate 359 is connected to its respective position in the second operand relocate register high 301. Each of the AND gates 357 associated with the instruction relocate register high 300 is gated by an enabling signal from an instruction latch 360, shown in FIG. 4*f*, an inverter 361 and the line 337. Each of the AND gates 358 associated with the first operand relocate register high 302 is gated by the enabling signal originating in a first operand latch 363, an inverter 364 and the line 338. Each of the AND gates 359 associated with the second operand relocate register high, 301 is gated by an enabling signal originating in a second operand latch 365, an inverter 366 and the line 339.

The latch 360 is equipped with a plurality of input signals, one of which is from an AND gate 367 and a second of which is from an AND gate 368. The AND gate 368 is equipped with a plurality of input signals, the first of which is an enabling signal from a relocate latch 369, shown in FIGURE 4*h*, a second of which is a one-time timing signal from the clock, the third of which is an enabling signal from a relocate mode decode circuit 370 and the fourth of which is an enabling signal from a storage one cycle decode circuit 371. The AND gate 367 has a plurality of input signals, the first of which is the Y5 decode circuit from the active storage address assembler 27 and the second of which is the Y4 enabling signal from the active storage address assembler 27 shown in FIGURE 2. In effect, the enabling signals on the lines Y4 and Y5 indicate whether the logical address presently undergoing dynamic storage relocation is associated with a first operand, second operand, or instruction address. The development of the address signals on these lines 44 and 45 is completely described in a co-pending U.S. patent application entitled "Storage Addressing Mechanism Having Plural Address Generating Paths" by W. P. Hanf et al., Ser. No. 670,917, filed Sept. 27, 1967, and assigned to the assignee of the present invention. The circuits 367 and 368 and the latches 360, 363, and 365 decode the address on the lines Y4 and Y5 and indicate whether it is a hexadecimal 14, a hexadecimal 15, or neither of the previously mentioned two. As shown in FIG. 5*b*, a hexadecimal address of 14 is always associated with the second operand address. A hexadecimal address of 15 is always associated with a first operand address. If the address being decoded is not associated with either of these two addresses, yet it has an active Y4 or Y5 bit, it is an address associated with an instruction. The instruction address is a hexadecimal 10. Therefore, when a hexadecimal address of 15 is being decoded at the storage address assembler, it sets the first operand latch 363. When a hexadecimal address of 14 is being decoded in the active storage address circuit 27, it sets the second operand latch 365. When neither of these two addresses are being decoded, the instruction latch 360 is set.

The compare circuit 314, shown in FIGURE 4*c*, receives input information from the main data bus 16 and from the relocate bus 340. Actually, two compare operations are being performed simultaneously within the circuit 314. Within a plurality of AND gates 372, the low four bits of the logical address from the MDB 16 are compared with the corresponding bits on the relocate bus 340. An AND gate 372 provides an input to an OR gate 373 whenever the applied input signals are dissimilar in any manner. The OR gate 373 provides an input signal to the instruction mis-match latch 318. Within a plurality of AND gates 374, the next four bits of the logical address from the MDB 16 are compared with the respective bits on the relocate bus 340. The output from an AND gate 374 sets an OR gate 375 which in turn provides an input to the page mis-match circuit 320. Within a plurality of AND gates 376, the next four bits of the logical address from the MDB 16 are compared with the respective bits on the relocate bus 340. The output of each AND gate 376 is applied to an OR gate 377. The AND gates 374 and 376 operate the same as an AND gate 372.

Due to circuit requirements, the latch 320 comprises two identical circuits, 378 and 379. The circuit 378 includes a pair of AND gates 380 and 381. The output of the AND gates 380 and 381 is applied to an OR gate 382. The AND gate 380 is equipped with a plurality of input signals; the first of which is the output of the AND gate 375 and the second of which is the output of a Relocate Enabling circuit 383. The AND gate 381 is equipped with a plurality of input signals, the first of which is the output of the Enabling circuit 383 as applied by an inverter 384, the second of which is the output of an AND gate 385, shown in FIG. 4*h*, and the third of which is the latched-back output signal of the OR gate 382.

The circuit 379 comprises a pair of AND gates 386 and 387. The output of the AND gates 386 and 387 are applied to an OR gate 388. The AND gate 386 is equipped with a plurality of input signals; the first of which is the output of the OR gate 377, and the second of which is the output of the inverter gate 384. The AND gate 387 is equipped with a plurality of input signals; the first of which is the output of the AND gate 383, the second of which is the output of the AND gate 385, and the third of which is the latched-back signal from the OR gate 388. The output of the OR gate 382 is applied to an OR gate 389 which has as its second input the output of the OR gate 388. The OR gate 389 generates opposite polarty output signals. The OR gate 389 appiles its output signal to an OR gate 390 shown in FIGURE 4*a*. This signal indicates that a page mis-match has occurred and that the DSR mechanism must be automatically transferred to its mode of operation whereby a new address signal will be transferred to the respective Relocate register high 300, 301, or 302.

The AND gate 383, shown in FIG. 4*c*, is equipped with a plurality of input signals; the first of which is a Relocate Mode Enabling signal from the circuit 370 shown in FIGURE 4*f*, the second of which is the storage #1 cycle Enabling signal from the circuit 371, the third of which is the three-time timing signal from the clock circuit, and the fourth of which is the output of the Relocate Active circuit 369. The AND gate 385, shown in FIG. 4*h*, is equipped with a plurality of input signals, the first of which is the 6, 7, 8 timing signal from the clock circuit, and the second of which is the Storage Two Cycle Enabling signal from the circuit 350.

The instruction mis-match latch 318 comprises a pair of input AND gates 391 and 392. The AND gate 392 is equipped with a plurality of input signals; the first of which is the output of the inverter 384, the second of which is the output of the AND gate 385, and the third of which is the latched-back signal from the OR gate 393. The OR gate 393 generates opposite polarity signals. The first signal is an input to OR gate 390. The outputs from the AND gates 391 and 392 are applied to an OR gate 393. The AND gate 391 is equipped with a plurality of input signals, the first of which is the output of an OR gate 394 shown in FIGURE 4*h*, the secnod of which is the output from the OR gate 373, and the third of which is an output of the AND gate 383.

The output from the OR circuit 390 is applied as an enabling input to each of the gates 353, 354, and 355. A second input signal to the first operand mis-match gate 353 is the output signal from the latch 363. The second input signal to the second operand mis-match 354 is the output signal from the second operand latch 365. The second input signal to the instruction mis-match gate 355 is the output signal from the instruction latch 360.

Figure 4H:
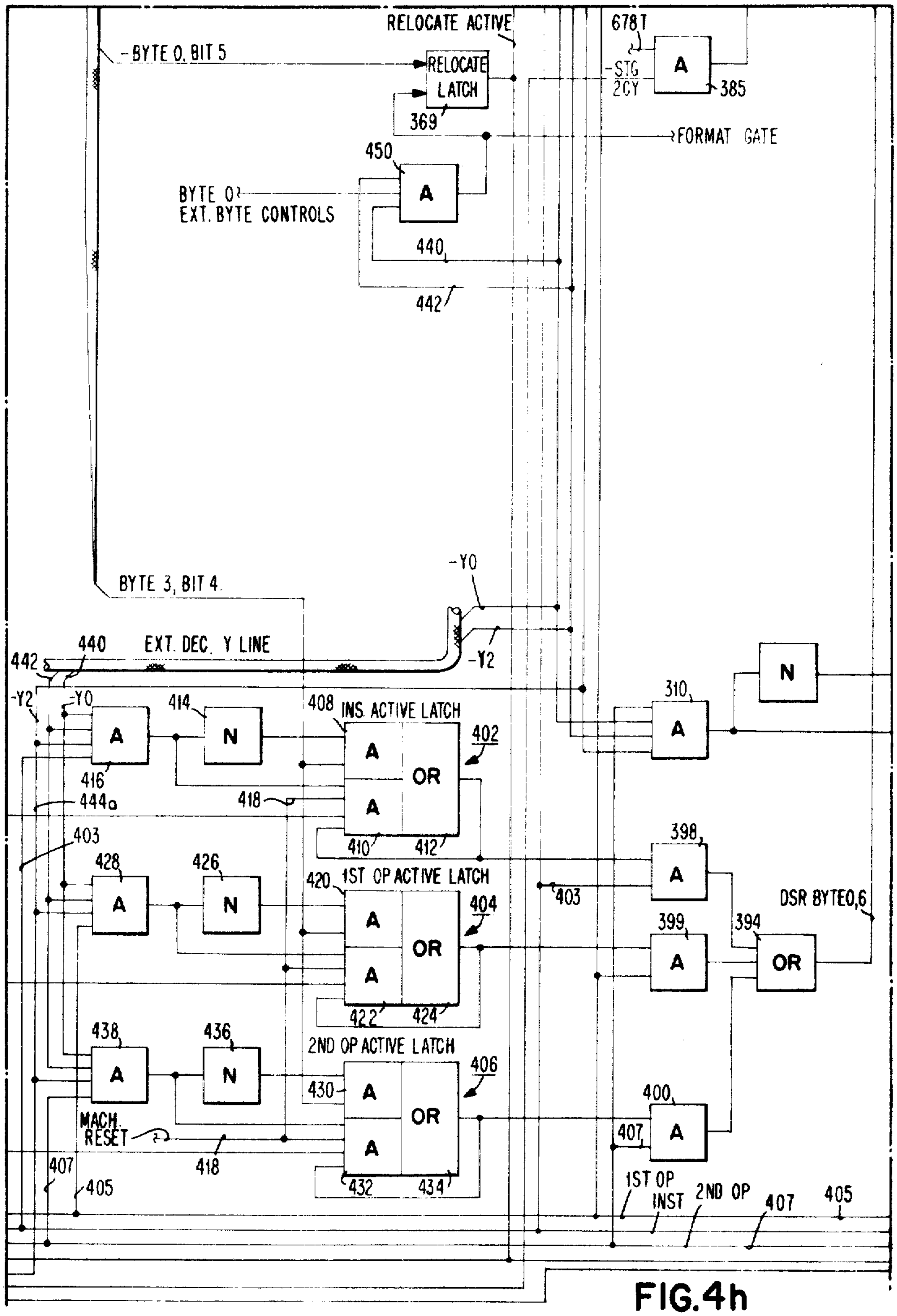
Figure 4I:
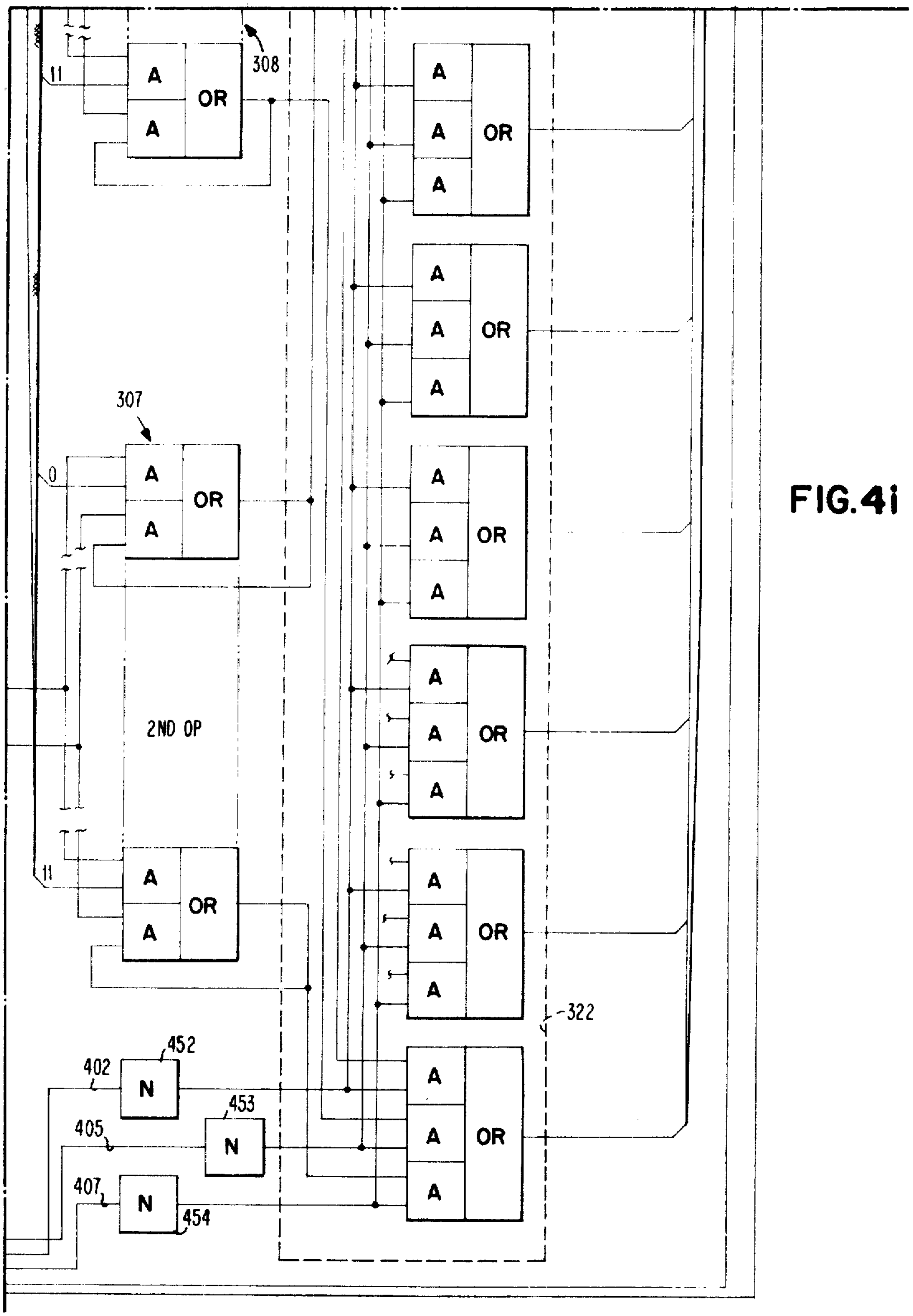

The OR gate 394, shown in FIG. 4*h*, is equipped with a plurality of input signals from a plurality of AND gates 398, 399 and 400 respectively. The AND gate 398 is equipped with a pair of input signals, the first of which is from an instruction active latch 402 and the second of which is from the instruction latch 360 on a line 403. The AND gate 399 is equipped with a pair of input signals, the first of which is from the first operand latch 404 and the second of which is from the first operand latch 363 on a line 405. The AND gate 400 is equipped with a pair of input signals, the first of which is from the second operand active latch 406 and the second of which is from the second operand latch 365 on a line 407. The instruction active latch 402 is equipped with a pair of input gating circuits 408 and 410. The output from the AND gates 408 and 410 is applied to an OR gate 412. The AND gate 408 is equipped with a pair of input signals, the first of which is from an inverter 414 and the second of which is the contents of the main data bus, byte 3, bit 4.

The AND gate 410 is equipped with a plurality of input signals, the first of which is an output of an AND gate 416, the second of which is the output of the instruction mis-match gate 355, shown in FIG. 4*a*, and the third of which is the machined reset signal on a line 418. The output from the AND gate 416 is applied to the inverter 414. The first operand active latch 404 is equipped with a pair of AND gates 420 and 422. The output of the gates 420 and 422 are applied to an OR gate 424. The AND gate 420 has a pair of input signals, the first one of which is from the main data bus, byte 3, bit 4, and the second of which is the output from an inverter 426. The AND gate 422 is equipped with a plurality of input signals, the first one of which is the output from an AND gate 428, the second of which is the machine reset signal on the line 418, and the third of which is the output signal from the first operand mis-match gate 353, shown in FIG. 4*a*. The second operand active latch 406 is equipped with a pair of AND gates 430 and 432. The output of the AND gates 430 and 432 are applied to an OR gate 434. The AND gate 430 is equipped with a pair of input signals, the first one of which is from an inverter 436 and the second of which is a main data bus byte 3, bit 4. The AND gate 432 is equipped with a plurality of input signals, the first one of which is a machine reset signal on the line 418, a second one of which is the output signal from an AND gate and the third of which is the second operand mis-match enabling signal from the second operand mis-match gate 354. The output of the AND gate 428 is also applied to the inverter 426. The ouput from the AND gate 438 is applied to the inverter 436.

The AND gate 416 is equipped with a plurality of input signals, the first of which is the —Y0 enabling signal from an external decode line 440, a second one of which is the enabling output signal on a —Y2 decode line 442, a third one of which is the storage read cycle enabling signal from a decode circuit 444, shown in FIG. 4*f*, on a line **444*a*, and the fourth of which is the ouput signal from the instruction latch 360 on a line 403. The AND gate 428 has the same enabling signals as the AND gate 460 on the lines 440, 442 and the circuit 444 and then additionally has an enabling signal from the first operand latch 363 on a line 405. The AND gate 438 is equipped with the three enabling signals on the lines 440, 442 and from the circuit 444 and then additionally is equipped with the enabling output signal from the second operand latch 365 on a line 407**.

The relocate latch 369 is equipped with a pair of input signals; the first one of which is from an AND gate 450 and the second one of which is from the main data bus, byte 0, bit 5. The AND gate 450 is equipped with a plurality of input signals, the first one of which is from the line 440, the second one of which is from the line 442 and the third one of which is the byte 0 enabling signal from the external destination byte controls.

The output of the gate 309 shown in FIGURE 4*c* is employed to gate the translated or actual memory address from the instruction relocate register low 306. The AND gate 309 is equipped with a plurality of input signals, the first one of which is from the line 440, the second of which is from the line 442, a third one of which is from the circuit 444, and the fourth one of which is the enabling signal originating in the instruction latch 360 on the line 403. AND gate 310, shown in FIG. 4*h*, is equipped with the same three enabling signals as the AND gate 309 on the lines 440, 442 and the circuit 444 and has additionally an enabling signal from the second operand latch 365 on the line 407.

The AND gate 311, shown in FIG. 4*c*, is equipped with the same three enabling signals on the lines 440, 442 and the circuit 444 and is additionally equipped with enabling signals originating from the first operand latch 363 on the line 405. One of the gates 309, 310, and 311 is selected by an enabling signal coming up exclusively on one of these lines 403, 405, and 407 respectively. The enabling signal from the selected gate gates the contents of the main data bus 16 into its respective relocate low register 306, 307, or 308. The output gating circuit 322 is similar to the gating circuit 316. A selected relocate low register is gated by one enabling signal selected from the lines 403, 405, 407 and its respective inverter circuit 452, 453, and 454, shown in FIG. 4*i*. In the same manner, the signal which gates the contents of a relocate high register into the compare circuits 314, also gates the contents of the respective relocate low register into a relocate match gating circuit 456.

The function of the circuit 456 is the final gating of the translated address into the memory register 40, byte position 1, and in the lower half of byte position 2. The gating circuit 456 is equipped with as many stages as there are OR gates in the gating circuit 322. Each of the AND gates in the circuit 456 has one input furnished thereto by the corresponding stage OR gate in the gating circuit 322. The remaining gating signal to each of the AND gates is furnished by an AND gate 458. The AND gate 458 is equipped with a plurality of input signals, the first of which is the relocate active signal originating in the relocate active latch 369 and the second of which is the RELOCATE MODE signal originating in the circuit 370 shown in FIGURE 4*f*. The final input signal is the STOR- AGE ONE CYCLE enabling signal originating in the circuit 371. The function of the gate 456 is to enable the gating of the translated address into the register 40 at the proper time of the machine cycle.

The AND gate 351, shown in FIG. 4*f*, is equipped with a plurality of input signals, the first of which is the PLUS STORAGE 2 CYCLE enabling signal from the circuit 350, and the second of which is the output signal from an AND gate 460. The AND gate 460 is part of the C register decode circuit and is equipped with a plurality of input signals, the first of which is the minus C0, bit 4 input signal, the second of which is the plus C0, bit 0 input signal, and the third of which is the minus C0, bit 7 input signal. The circuit 350 comprises a pair of AND gates 462 and 464. The output from the AND gates 462 and 464 is applied to an OR gate 466. The AND gate 462 is equipped with a plurality of input signals, the first of which is the output signal of a circuit 468 and the second of which is the output signal of an inverter 470. The AND gate 464 is equipped with a plurality of input signals, the first of which is a one-two timing signal from the clock circuit and the second of which is the minus storage 2 cycle output signal of the circuit 350. The input to the inverter 470 is the one-two input signal from the clock. The circuit 468 is equipped with a plurality of input AND gates 470 and 472. The outputs from the AND gates 470 and 472 are applied to an OR gate 474. The AND gate 470 is equipped with a plurality of input signals, the first of which is the minus storage 2 cycle output signal of the circuit 350, the second of which is the output of the AND gate 371, and the third one of which is the output of the inverter 476. The AND gate 472 is equipped with a plurality of input signals, the first of which is the latched-back signal from the OR gate 474, the second of which is the restart reset enabling signal which initializes the operation of the entire processing system, and the third of which is the six-seven-eight timing signal of the clock circuit. The six-seven-eight timing circuit is also applied as an input to the inverter 476. The AND gate 352 is equipped with a plurality of input signals, the first of which is the minus storage 2 cycle output signal of the circuit 350, the second of which is the output of an AND gate 478. The AND gate 478 is a portion of the register decode circuit 9*b* and is equipped with a plurality of input signals, the first of which is the plus C0, bit 4 input signal, the second of which is the plus C0, bit 0 input signal, and the third of which is the minus C0, bit 1 input signal. The output from the AND gate 478 is also applied as an input to the AND gate 444. The AND gate 444 is also equipped with an additional input signal from an AND gate 480. The AND gate 480 is equipped with a plurality of input signals, the first of which is from the STORAGE WORD enabling signal from the AND gate 371 and the second of which is the plus storage 2 cycle output signal from the circuit 350. The AND gate 371 is a portion of the control register decode circuit 9*b* and is equipped with a plurality of input signals, the first of which is the minus C0, bit 1 input signal, the second of which is the plus C0, bit 0 input signal.

The circuit 370 is equipped with a plurality of AND gates 482 through 485. The output of the AND gate 482 provides one input to the remaining AND gates 483 through 485. The output from the gates 483, 484, and 485 are applied as an input to an OR gate 486. The AND gates 482 through 485 operate as a portion of the control register decode circuit 9*b*. The AND gate 482 is equipped with a plurality of inputs, the first of which is the minus C2, bit 4 enabling signal, the second of which is the minus C2, bit 5 enabling signal. The AND gate 483 is equipped with a plurality of signals, the first of which is the output from the AND gate 482, the second of which is the plus C2, bit 6 input signal, and the third of which is the plus C2, bit 7 input signal. The AND gate 484 is equipped with a plurality of signals, the first of which is the output of the AND gate 482, the second of which is the plus C2, bit 6 input signal and the third of which is the minus C2, bit 6 input signal. The AND gate 485 is equipped with a plurality of input signals, the first of which is the output of the AND gate 482, the second of which is the minus C2, bit 6 input signal, and the third of which is the minus C2, bit 7 input signal. The output of OR gate 486 indicates that the CPU is operating in the relocate mode and enables the remaining circuits to operate.

INITIAL RELOCATION PROCESS

Figure 5A:
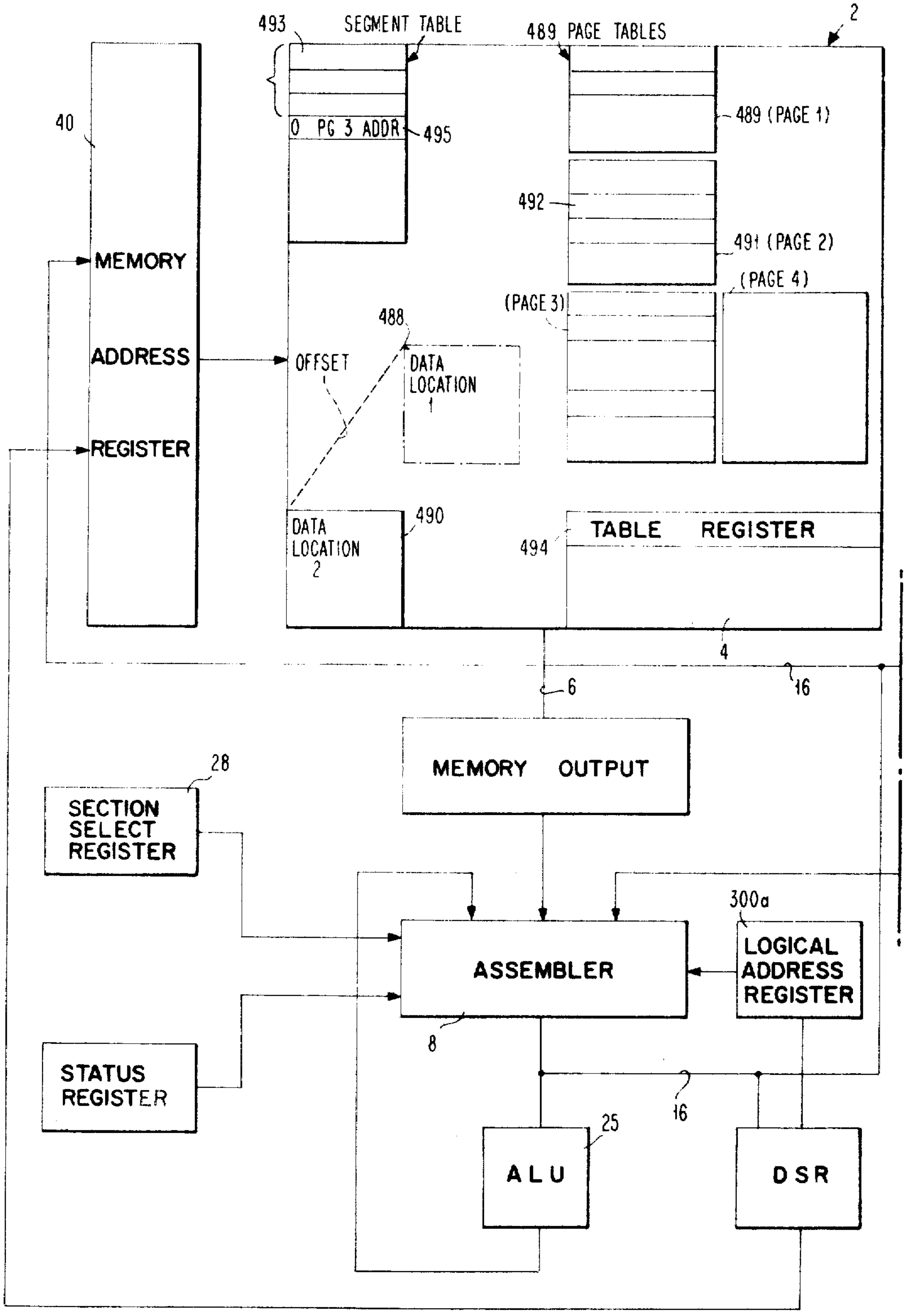
FIGS. 5*a* and 5*b* are a functional layout of a processing system having a dynamic storage relocate capability.
Figure 5B:
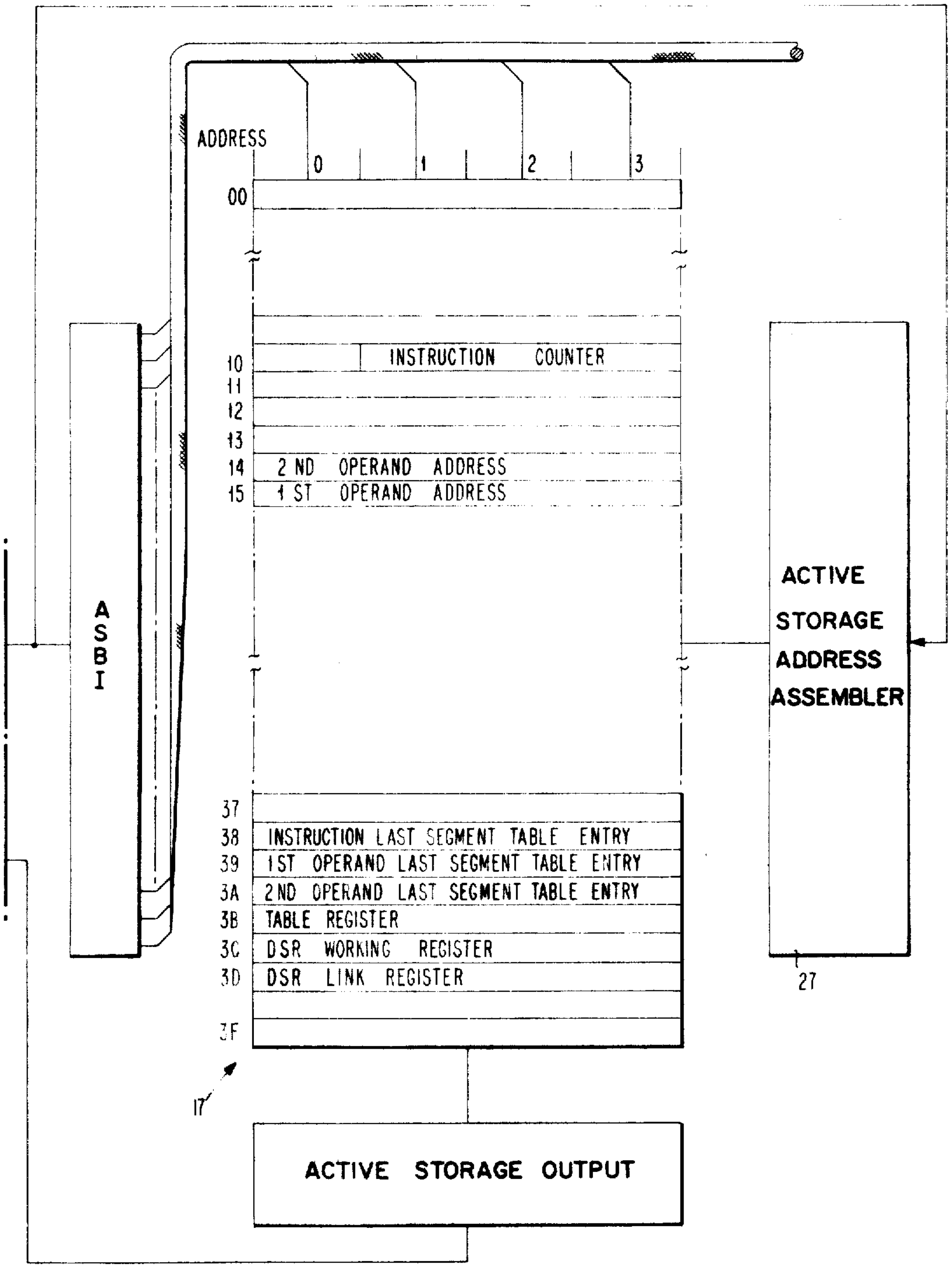

Referring to FIGS. 5*a* and 5*b*, there can be seen a composite schematic view wherein various components shown in greater detail in other figures are joined together to facilitate the understanding of the operation of the instant invention. In review, the active storage circuit 17 comprises a plurality of individual registers, each having a unique address as illustrated in FIG. 5*b* starting at address 00 and continuing through address 3F in hexadecimal notations. Certain of these registers are not involved in the dynamic relocation storage operation and therefore these registers are not shown.

As is well known in the prior art, a program status word (PSW) is the means of controlling the operation of the processing system while it is executing a particular task. In addition to the functions already fulfilled by the PSW, a new function is added whereby in a particular bit in the PSW indicates whether the processing system is operating under dynamic storage relocation conditions. It is the periodic testing of setting of this bit and its subsequent detection which enables the dynamic storage relocation procedure to be practiced on each logical address developed by the data processing system. Since it is the logical address which directs the main storage address mechanism of the data processing system to retrieve a piece of information from the main storage, it is only the logical address which is subject to inspection by the dynamic storage relocation procedure. The information that is held in main storage is of three general classes. Accordingly, there are three classes of addresses. The active storage circuit 17 has a corresponding storage position for each of these separate classes of information. The instruction address is held in the instruction counter having an address of 10. The first operand address is held in the address location 15. The second operand is held in location having the address 14. As is well tions, address locations 10, 14 and 15 respectively, is built by the normal operating procedure of the processor. Once the OP code has been decoded and the logical address built in the aforesaid location, the dynamic storage relocation circuit 52 is brought into operation. Referring to FIG. 3, the logical address is separated into two portions. A portion of it is loaded directly into the register 40, byte 3 and the upper half of byte 2, and the high order portion is gated into a compare circuit 314 whereupon that high order portion of the logical address is compared with the contents of the corresponding relocate high register 300, 301, and 302. Assuming that the following discussion is directed toward an instruction, the contents of the register 300 would be compared with the high order portion of the instruction address originating from the instruction counter in storage. If this is the first instruction to be interpreted or investigated by the dynamic storage relocation system 52, there is no address in the instruction register 300. Therefore, a non-compare signal is generated since the instruction active latch 402, shown in FIG. 4*h*, is in the reset condition and the instruction mis-match latch 318 is set to indicate this condition. In response to the setting of the mis-match latch 318, it is the function of the automatic circuitry to retrieve an address which represents the new location of the desired instruction. This relocation of instruction and data is inherent in a time-sharing system.

A separate and distinct function which the time-sharing system is capable of performing but which is not a portion of the present invention, is the actual placement of groups of information called "pages" into storage. The separate and distinct function of the data processing system, operating in the time-sharing mode of operation, is the actual transfer of pages of information from a bulk storage unit, such as a disk device, into randomly located page segments of main memory. Referring to FIG. 5*a*, for example, a page of information may have originally been stored at a data location #1 indicated by the designator 488 during one storage interval in main storage. Its identifying address, indicated by the upper left-hand corner of this page of information, had been identified by its corresponding location in a page table address area 489. There are several page tables shown and each one contains a group of addresses for identifying their corresponding data locations, for example #1, 488. At some time subsequent, the storage capacity of the main storage is exceeded and it is necessary to select an inactive page of information and return it to the bulk storage unit until it is needed. Systems are available whereby an economical method is employed for removing relatively inactive pages of information. For purposes of our explanation, data location #1 has been transferred back to the bulk storage unit and a new page of information has taken its position. At some time later, while the new page of information at location 488 is still being periodically processed, the old page of information previously in location 488 is needed again. However, it cannot be placed into its same position since location 488 is occupied; therefore, it must be stored in a new data location indicated at 490. As seen by referring to FIG. 5*a*, there is an address offset between the starting position of the page of information originally at data location #1 and now at data location #2. It is the functioning of the time-sharing systems, which functions are not a part of the present invention, for sensing this address offset and making the appropriate entry into the corresponding page table entries in the page tables 489. A location 491 has been assigned to our page of information and a portion 492 of this entry is now changed to represent the address offset experienced by the new location of a page of information. It is the express purpose of the present invention to use as one of its information sources the various segment tables 493 and page tables 489 which are generated by the various time-sharing programming systems to reflect the various addresses assigned to the various pages of information presently operable in the system.

Figure 6A:
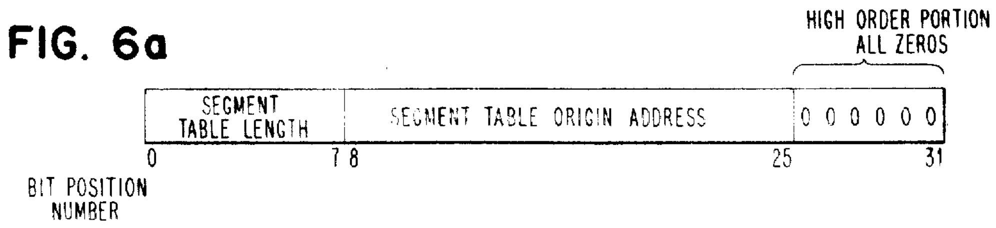
FIGS. 6*a*, 6*b*, and 6*c* show address formats of various positions employed in the instant invention.

Upon the indication of a mis-match in the DSR circuit 52, the branch and link information is stored away to identify the instruction which caused the mis-match. This branch and link information comprises the contents of the registers 28 and 136 and the back-up register 42. This information is stored in address location 3D in the active storage circuit 17. The section select register 28 is loaded with a hexadecimal 1–7 information. The 1 is employed for pointing to the section of active storage associated with the address locations 10, 14 and 15 while the 7 is a pointing address to the address locations 38 through 3D. The main storage circuit 2 has a control section portion 4 and one of the register locations in the control section 4 is a table register 494. The table register format is shown in FIG. 6*a*. Bits 0 through 7 contain the segment table length or number of groups of sixteen entries. There are four bytes per entry. Bits 8 through thirty-one contain the segment table origin address. Since this table is located on a sixty-four byte boundary, bits 26 through 31 are zero. The contents of the table register are accessed and transferred to the working register location 3C in active storage 17. The segment table origin address portion of the table register 494 points to the beginning location of the segment table 493 held in main storage 2. It is now the function of the DSR mode of operation to add the segment table address in the table register 494 with a portion of the logical address built by the processing system. Not only is the instruction logical address resident in the location 38 of active storage 17, but also it is gated into the registers 300 and 306. The high order four bits represent the segment table number. This segment table number is added to the segment table address in a particular manner.

Figure 6B:
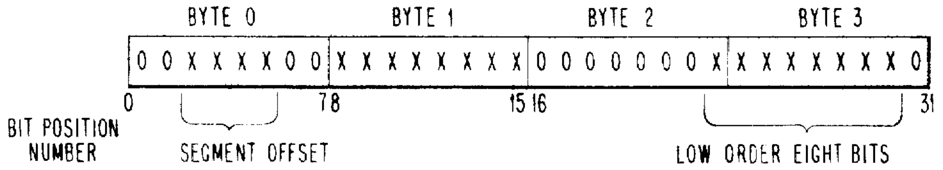

This addition requires that the high order four bits of the logical address are employed as the center four bits of an eight bit byte. The high order two bits and the low order two bits of this byte are zeros. This byte is added to the high order byte of the segment table origin address as a segment offset. The transposal of the high order four bits of the logical address is achieved by gating out of the register 300 into the EXTERNAL Assembler 10 as generally indicated in FIG. 3. A complete description of this gating is given in a copending U.S. patent application by K. A. Bell et al. entitled "Address Modification," Ser. No. 681,465, filed Nov. 8, 1967, and assigned to the assignee of the present invention. The format of this segment offset is shown in FIG. 6*b* at byte 0. Bits 0 through 7 contain the logical address segment number properly offset within a byte boundary for address arithmetic with the segment table origin address. Bits 8 through 15 contain the logical address page number within a byte boundary for page table length comparison. Bits 16 through 31 contain the logical address page number offset across two bytes for proper address arithmetic with the page table origin address.

Figure 6C:
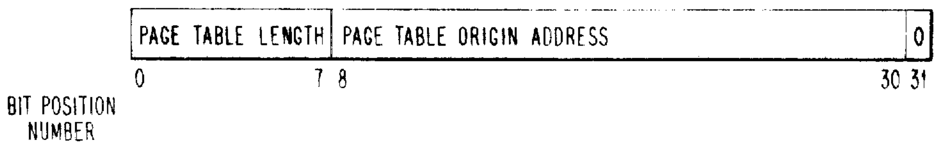

The addition of the segment offset to the high order portion of the segment table origin address identifies a particular segment table entry which identifies the storage area generally reserved for the page tables 489. The above mentioned addition identifies location 495 which has a format as shown in FIG. 6*c*.

Bits 0 through 7 of the segment table contain the page table length. The page table length is the number of entries in a page table. Bits 8 through 30 contain the page table origin address. It is this portion of the segment table entry 495 which indentifies the storage area generally reserved for the page table 489. Bit 31 is the page table availability bit. This bit identifies the physical availability in core of all pages associated with the segment table address.

There is a segment table entry held in a particular storage location in active storage 17 for all classes of logical addresses. The instruction last segment table entry is held in location 38. The first operand last segment table entry is held in location 39. The second operand last segment table entry is held in location 3A.

Since the description is concerned with an instruction, the contents of the register 38 is added with the low order eight bits of the register 300. The low order eight bits are transposed into the format shown in byte 2 and byte 3 of FIG. 6*b*. This addition identifies a particular page such as page two 491 and an offset with the page 491 to an entry identified as 492. The contents of location 492 have been previously changed by the time-sharing system operating programs to reflect the offset address indicia change in transferring the page of information from data location #1 to data location #2. This information is now transferred to their relocate registers low, 306, shown in FIG. 3 over the MDB 16. The successful loading of this register 306 causes a branch and link storage control function which returns the information held in active location 3D to the registers 28, 136, and 42. This causes a re-execution of the instruction originally causing the mis-match. Now, when the contents of the logical address are compared with the contents of the instruction register high, 300, there must be a match since the automatic system has previously loaded the same information from the logical address into the instruction register high. Upon the indication of a compare equal operation, the contents of the instruction register low just loaded from the area 492 of the page table, is now transferred into the byte one location of the register 40 and the low order of the byte two location of the register 40. The contents of the registers 125 and 126 in the register 40 now reflect the proper location of the offset indicia of the page of information while the remaining contents of the registers 126*a* and 127 in the register 40 identify the actual byte within the page of information.

SUBSEQUENT RELOCATION OPERATION

Subsequent address built by the system will also undergo DSR testing, but the testing should be successful while the data is removed from the same page which was identified in the initialization relocation process. Assuming that all three registers 306, 307 and 308 have been loaded with the translated address, it is now shown that the next sequential need for one class of logical address is immediately obtainable by the instant invention. There is no systems delay while using the present relocation operation when compared to a system not employing a relocation function.

The relocate latch 369 is turned on by the bit signal in the PSW. The circuit 370 decodes a portion of the current control word that this word is to be executed only in relocate mode. The circuit 368 is enabled providing an output signal to the latches 360, 363 and 365. The output of the AND gate 368 in combination with the contents of the local store address bus selects the instruction latch 360.

The output from the instruction latch gates the contents of the register 300 to the compare circuit 314 by the enabling signal on the line 337 and the plurality of AND gates 357. The output from the latch 360 sets the active latch 402 and provides an enabling input signal to the AND gate 409 and an inverter 452. Since the compare circuit indicates a compare equal operation, the latches 318 and 320 remain disabled. The instruction mis-match gate 355 remains on which allows the gate 303 to load the contents of the MDB 16 into the register 300. The contents of the register 306 is gated into the registers 125 and 126 by the circuits 322 and 356. The contents of the register 306 is also read out when a logical address in the instruction class is being used. The final gating indicates that the contents of the register 306 is a relocated address and is valid. This valid signal is the DSR TRAP INACTIVE signal on a line 490 applied to the AND gate 458. This enabling signal on the line 490 is equivalent to a compare equal signal from the compare circiut 314. The remaining classes of logical addresses are handled in a similar manner.

While the invention has been particularly shown and described with reference to a preferred embodiment thereof, it will be understood by those skilled in the art that various changes in form and details may be made therein without departing from the spirit and scope of the invention.

What is claimed is:

1. A data processing system comprising an immediate access storage device having a plurality of separate storage positions and signal controlled address selection means for rendering any chosen one of said storage positions accessible, a secondary bulk storage device having a plurality of separate storage position and signal controlled address selection means for rendering any chosen one of said storage positions accessible, means for grouping a plurality of separate storage positions in the bulk storage device as a unit of data and for transferring said unit into a contiguous group of storage positions of said immediate access storage device by providing a group of address signals to its address selection means, said group of signals being identified by a logical address referenced to said immediate access storage device storage positions, said logical address being divided into a plurality of distinct portions and one of said portions being common to all logical addresses of signals in one group, said transfer means including means for effecting transfer of said uint of data to a location in the immediate access storage device relocated from said logical address identifying location and including means for generating a translated address for identifying the relocated location, and means coupled to the transfer means for automatically substituting said translated address for said logical address upon subsequent attempts to address an additional location in said group.

2. A data processing system as recited in claim 1, wherein said means for automatically substituting includes, means for separately storing said one portion of said logical address from said translated address corresponding thereto, means for comparing said stored one portion of the logical address with the corresponding portion of the next sequentially generated logical address, and means responsive to said comparing means for substituting said translated address for said one address portion.

3. A data processing system as recited in claim 2, in which said means for automatically substituting includes includes means for identifying one of a plurality of classes of logical addresses and said means for separately storing includes a pair of storage devices for each class of logical addresses.

4. A data processing system as recited in claim 2 in which said means for automatically substituting includes, means for indicating a mismatch between the comparison of the contents of said means for separately storing logical address section and said next sequentially generated logical address, and means responsive to said indicating means to obtain a translated address corresponding to said subsequent logical address.

5. A data processing system as recited in claim 2 in which said means for automatically substituting includes, activity indicating means for signifying that the preceding logical address is referring to a group of logical addresses presently held in said immediate access storage device.

6. A data processing system comprising, an immediate access storage device having a plurality of separate storage positions and signal controlled address selection means for rendering any chosen one of said storage positions accessible, a secondary bulk storage device having a plurality of separate storage positions and signal controlled address selection means for rendering any chosen one of said storage positions accessible, means for arranging said separate storage positions in said bulk storage device into a plurality of distinct page groups and for transferring certain of said page groups to said immediate access storage device by providing address signals to its signal controlled address selection means, said transfer means operating to randomly arrange said page groups on page group address boundaries, said page groups of signals each being identified by separate classes of logical addresses referred to said immediate access storage device storage position, each of said logical addresses being divided into a plurality of distinct portions and one of said portions being common to all logical addresses of signals in one page group, said transfer means including means to randomly arrange said page groups on page group address boundaries at locations in the immediate access storage device relocated from said logical address identifying location and including means to generate a translated address for identifying the relocated location, and means for automatically substituting said translated address for each class of logical addresses upon subsequent attempts to address an additional location in said group.

7. In a processing system operating in a Dynamic Relocation mode of operation wherein a series of logical address indicia are built by the system and these logical addresses are not directly usable since the system has a further capability of relocating data and instructions without need of re-assembling the correlation between the actual address location of data and the symbolic address used by the programmer to select that data, and employing means for translating said symbolic address into a translated address referring to the current actual address, an address examination device comprising, a source of logical addresses, a plurality of storage devices arranged in related groups of two registers, a first register in a group being employed for storing a first logical address in a series of logical addresses, a second register in the group being employed for storing the translated address corresponding to said logical address, means for comparing a subsequent logical address with said contents of said first register, means responsive to said compare operation for reading said translated address out of said second register and substituting the translated address for said subsequent logical address, and utilization means for receiving said translated address from said second register to retrieve a data unit from its relocated position.

8. In a processing system operating in a Dynamic Relocation mode of operation wherein a first of a series of logical address indicia are relocated by a process of translation which furnishes a relocated address for the first logical address in the series, an address examination device comprising, a first storage device for storing the logical address and its translated equivalent, means for comparing the next logical address with the logical address held in said first storage device, and means for substituting said translated address for said logical address when the next logical address is identical with the first logical address.

9. In a processing system operating in a Dynamic Relocation mode of operation wherein a series of logical address indicia are relocated by a process of translation which furnishes a relocated address for the first logical address in the series and said logical addresses are of a plurality of distinguishable classes, an address examination device comprising, a plurality of storage devices, each of said devices storing the logical address and its translated equivalent for each class of logical addresses, means for identifying the class of the next logical address, means responsive to said identification for selecting said corresponding storage device, means for comparing the next logical address with its corresponding class logical address, and means for substituting said translated address for said logical address when the subsequent logical address is identical with the first logical address.

References Cited

UNITED STATES PATENTS

| | | | |
|---|---|---|---|
| 3,218,611 | 11/1965 | Kilburn et al. | 340—172.5 |
| 3,275,991 | 9/1966 | Schneberger | 340—172.5 |

RAULFE B. ZACHE, Primary Examiner